US012789084B2

(12) United States Patent
Matsuura

(10) Patent No.: US 12,789,084 B2
(45) Date of Patent: Nov. 10, 2026

(54) COMPUTER-READABLE NON-TRANSITORY STORAGE MEDIUM HAVING GAME PROGRAM STORED THEREIN, GAME PROCESSING SYSTEM, AND GAME PROCESSING METHOD

(71) Applicant: NINTENDO CO., LTD., Kyoto (JP)

(72) Inventor: Ryuhei Matsuura, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 187 days.

(21) Appl. No.: 18/745,481

(22) Filed: Jun. 17, 2024

(65) Prior Publication Data

US 2024/0416233 A1 Dec. 19, 2024

(30) Foreign Application Priority Data

Jun. 19, 2023 (JP) ................................ 2023-100096

(51) Int. Cl.
*A63F 13/52* (2014.01)
*A63F 13/497* (2014.01)
*A63F 13/55* (2014.01)

(52) U.S. Cl.
CPC ............ *A63F 13/52* (2014.09); *A63F 13/497* (2014.09); *A63F 13/55* (2014.09); *A63F 2300/6653* (2013.01)

(58) Field of Classification Search
None
See application file for complete search history.

(56) References Cited

U.S. PATENT DOCUMENTS

| | | | | |
|---|---|---|---|---|
| 6,361,438 | B1 * | 3/2002 | Morihira | A63F 13/45 463/31 |
| 6,831,659 | B1 * | 12/2004 | Mukoyama | A63F 13/45 463/31 |
| 10,719,978 | B2 * | 7/2020 | Dohta | A63F 13/577 |
| 2007/0232395 | A1 | 10/2007 | Fujii | |
| 2010/0220097 | A1 * | 9/2010 | Hamilton, II | G06T 15/00 345/419 |
| 2011/0190063 | A1 | 8/2011 | Kajii | |
| 2012/0252575 | A1 | 10/2012 | Iida et al. | |
| 2013/0344967 | A1 | 12/2013 | Kajii | |
| 2019/0262714 | A1 * | 8/2019 | Tokuda | A63F 13/67 |
| 2025/0041735 | A1 * | 2/2025 | Matsuura | A63F 13/69 |

FOREIGN PATENT DOCUMENTS

| | | |
|---|---|---|
| JP | 2005-319148 | 11/2005 |
| JP | 2010-017257 | 1/2010 |
| JP | 2010-088694 | 4/2010 |
| JP | 2010-172732 | 8/2010 |
| JP | 2012-213521 | 11/2012 |
| JP | 2016131662 A | 7/2016 |
| JP | 2020-018744 | 2/2020 |

* cited by examiner

*Primary Examiner* — Sunit Pandya
(74) *Attorney, Agent, or Firm* — Nixon & Vanderhye PC

(57) ABSTRACT

The own player character is drawn opaquely, and at least one character of other player characters is drawn translucently at a degree of transparency according to the number of the other player characters.

21 Claims, 21 Drawing Sheets

FIG.22

| OTHER-PLAYER-RELATED CHARACTER | | NUMBER OF OTHER-PLAYER-RELATED CHARACTERS IN DISPLAY SCREEN (MAX: 3) | DEGREE OF TRANSPARENCY | DEGREE OF TRANSPARENCY UNDER DETERIORATED COMMUNICATION CONDITION |
|---|---|---|---|---|
| OTHER PLAYER CHARACTER | NORMAL STATE (REMOTE MULTIPLAY) | 1 | 60% | 70% |
| | | 2 | 80% | 90% |
| | | 3 | 80% | 90% |
| | GHOST STATE, DURING EMOTION INDICATION, LOCAL MULTIPLAY | 1~3 | 0% | 0% |
| REPLAY CHARACTER | | 1 | 60% | 70% |
| | | 2 | 80% | 90% |
| | | 3 | 80% | 90% |

COMPUTER-READABLE NON-TRANSITORY STORAGE MEDIUM HAVING GAME PROGRAM STORED THEREIN, GAME PROCESSING SYSTEM, AND GAME PROCESSING METHOD

CROSS REFERENCE TO RELATED APPLICATION

This application claims priority to Japanese Patent Application No. 2023-100096 filed on Jun. 19, 2023, the entire contents of which are incorporated herein by reference.

FIELD

The present disclosure relates to information processing for a game or the like.

BACKGROUND AND SUMMARY

Conventionally, there has been known game processing in which multiple characters are displayed on a screen while a game advances.

If the number of characters displayed on the screen increases, it might become hard for a player to see a character operated by the player.

Accordingly, an object of the exemplary embodiments is to provide a computer-readable non-transitory storage medium having a game program stored therein, a game processing system, and a game processing method that make it possible to prevent a character operated by a player from becoming hard to see, even when the number of characters displayed on a screen has increased.

Configuration examples for achieving the above object will be shown below.

One configuration example is a non-transitory computer-readable storage medium having stored therein instructions which are executed by a processor of a game apparatus in which an own player character subjected to movement control on the basis of an operation by a user of the game apparatus, and other player characters each subjected to movement control on the basis of data acquired from at least one of other game apparatuses connected to the game apparatus via a network, are placed in a game space, and the game space is drawn, the instructions being configured to, when executed by the processor, cause the game apparatus to: draw the own player character opaquely; and draw at least one character of the other player characters translucently at a degree of transparency according to a number of the other player characters.

According to the above configuration, it is possible to prevent a player character operated by a player from becoming hard to see, even when the number of characters displayed on a screen has increased.

In another configuration example, the instructions may cause the game apparatus to: draw the at least one character at the degree of transparency according to the number of the other player characters drawn in the same screen.

According to the above configuration, it is possible to adjust how hard (how easy) the screen is to see, in accordance with the number of other player characters.

In another configuration example, the other player characters may include a player character operated by a user of the other game apparatus and a replay character subjected to movement control on the basis of a play record of a user of the other game apparatus.

According to the above configuration, it is possible to adjust how hard (how easy) the screen is to see, by adjusting a degree of transparency also for a replay character subjected to movement control on the basis of a play record of a user of another game apparatus.

In another configuration example, the instructions may cause the game apparatus to: perform movement control for the other player character on the basis of the data from the other game apparatus without causing the other player character to interfere with the own player character and an object placed in the game space.

According to the above configuration, a feeling of playing with another player can be provided moderately while ease of playing as in single play is kept, in multiplay.

In another configuration example, the instructions may cause the game apparatus to: draw the at least one character opaquely when a predetermined condition is satisfied.

According to the above configuration, it is possible to improve a play feeling in multiplay as necessary.

In another configuration example, the instructions may cause the game apparatus to: draw the at least one character at the degree of transparency according to a communication condition between the game apparatus and the other game apparatus.

According to the above configuration, when the communication condition is deteriorated, the degree of transparency is adjusted, whereby unnatural display of an other-player-related character can be made less conspicuous.

In another configuration example, the instructions may cause the game apparatus to: gradually change the degree of transparency of the at least one character when the number of the other player characters changes.

According to the above configuration, it is possible to naturally adjust the degree of transparency of an other-player-related character without giving a feeling of strangeness.

According to the exemplary embodiments, it is possible to provide a computer-readable non-transitory storage medium having a game program stored therein, a game processing system, and a game processing method that make it possible to prevent a character operated by a player from becoming hard to see, even when the number of characters displayed on a screen has increased.

BRIEF DESCRIPTION OF THE DRAWINGS

FIG. 22 illustrates a non-limiting example of degrees of transparency of other-player-related characters.

DETAILED DESCRIPTION OF NON-LIMITING EXAMPLE EMBODIMENTS

Hereinafter, an exemplary embodiment will be described.

[Hardware Configuration of Information Processing System]

Hereinafter, an information processing system (game system, game apparatus) according to an example of the exemplary embodiment will be described below. An example of a game system 1 according to the exemplary embodiment includes a main body apparatus (an information processing apparatus, which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies. Hereinafter, first, the hardware configuration of the game system 1 according to the exemplary embodiment will be described, and then, the control of the game system 1 according to the exemplary embodiment will be described.

Figure 1:
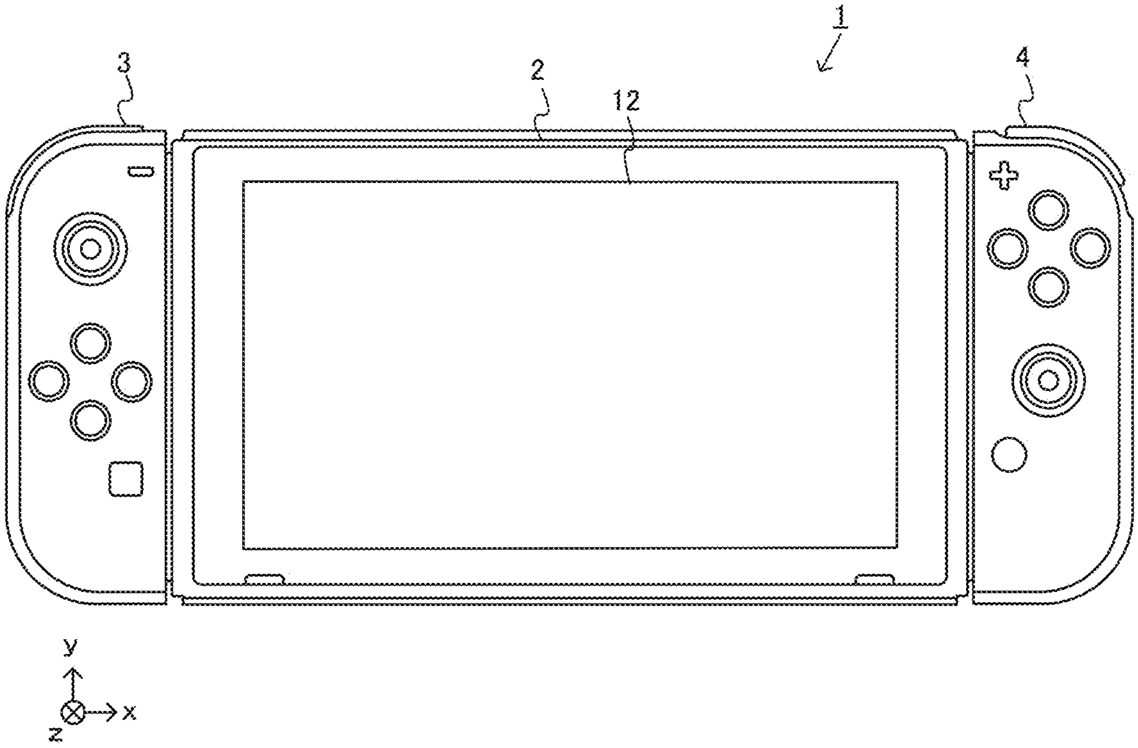
FIG. 1 shows a non-limiting example of a state in which a left controller 3 and a right controller 4 are attached to a main body apparatus 2.

FIG. 1 shows an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes in the game system 1. The main body apparatus 2 includes a display 12. Each of the left controller 3 and the right controller 4 is an apparatus including operation sections with which a user provides inputs.

In addition, the main body apparatus 2 includes a speaker, and a sound such as a sound effect is outputted from the speaker.

Further, the main body apparatus 2 includes a left terminal for the main body apparatus 2 to perform wired communication with the left controller 3, and a right terminal for the main body apparatus 2 to perform wired communication with the right controller 4.

Further, the main body apparatus 2 includes a slot. The slot is provided at an upper side surface of a housing of the main body apparatus 2. The slot is so shaped as to allow a predetermined type of storage medium to be attached to the slot. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2.

The left controller 3 and the right controller 4 each include various operation buttons and the like. The various operation buttons and the like are used to give instructions depending on various programs (e.g., an OS program and an application program) executed by the main body apparatus 2.

In addition, the left controller 3 and the right controller 4 each include a terminal for performing wired communication with the main body apparatus 2.

Figure 2:
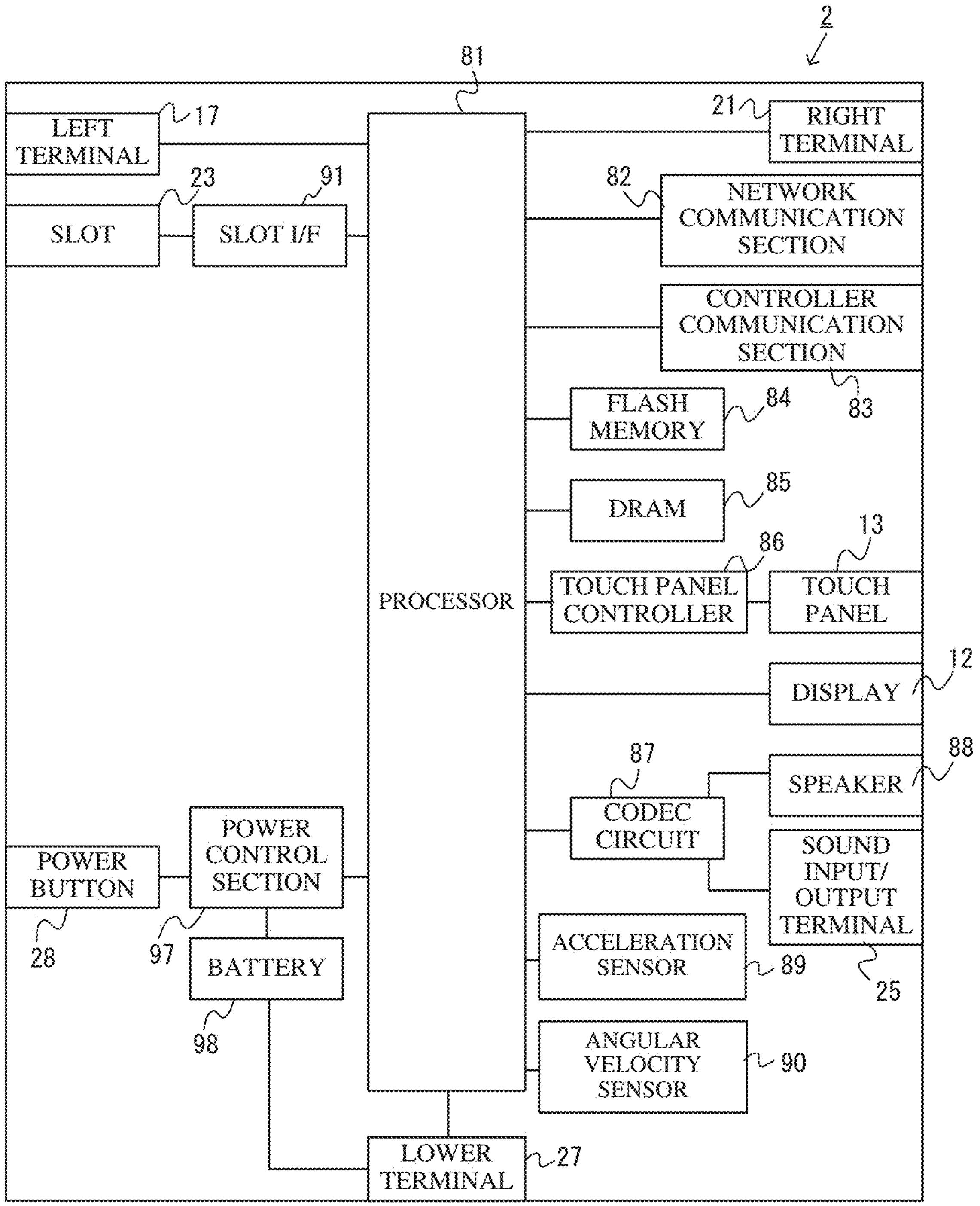
FIG. 2 is a block diagram showing a non-limiting example of the internal configuration of the main body apparatus 2.

FIG. 2 is a block diagram showing an example of the internal configuration of the main body apparatus 2. The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes the flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter, abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, the network communication section 82 connects to a wireless LAN by a method compliant with the Wi-Fi standard, for example, and performs Internet communication or the like with an external apparatus (another main body apparatus 2). Further, the network communication section 82 can also perform short-range wireless communication (e.g., infrared light communication) with another main body apparatus 2.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2, and the left controller 3 and the right controller 4, is discretionary. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

The main body apparatus 2 includes a touch panel controller 86, which is a circuit for controlling the touch panel 13. The touch panel controller 86 is connected between the touch panel 13 and the processor 81. On the basis of a signal from the touch panel 13, the touch panel controller 86 generates data indicating the position at which a touch input has been performed, for example, and outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown, the power control section 97 is connected to components of the main body apparatus 2 (specifically, components that receive power supplied from the battery 98, the left terminal 17, and the right terminal 21). On the basis of a command from the processor 81, the power control section 97 controls the supply of power from the battery 98 to the above components.

Further, the battery 98 is connected to the lower terminal 27. When an external charging device (e.g., the cradle) is connected to the lower terminal 27 and power is supplied to the main body apparatus 2 via the lower terminal 27, the battery 98 is charged with the supplied power.

Figure 3:
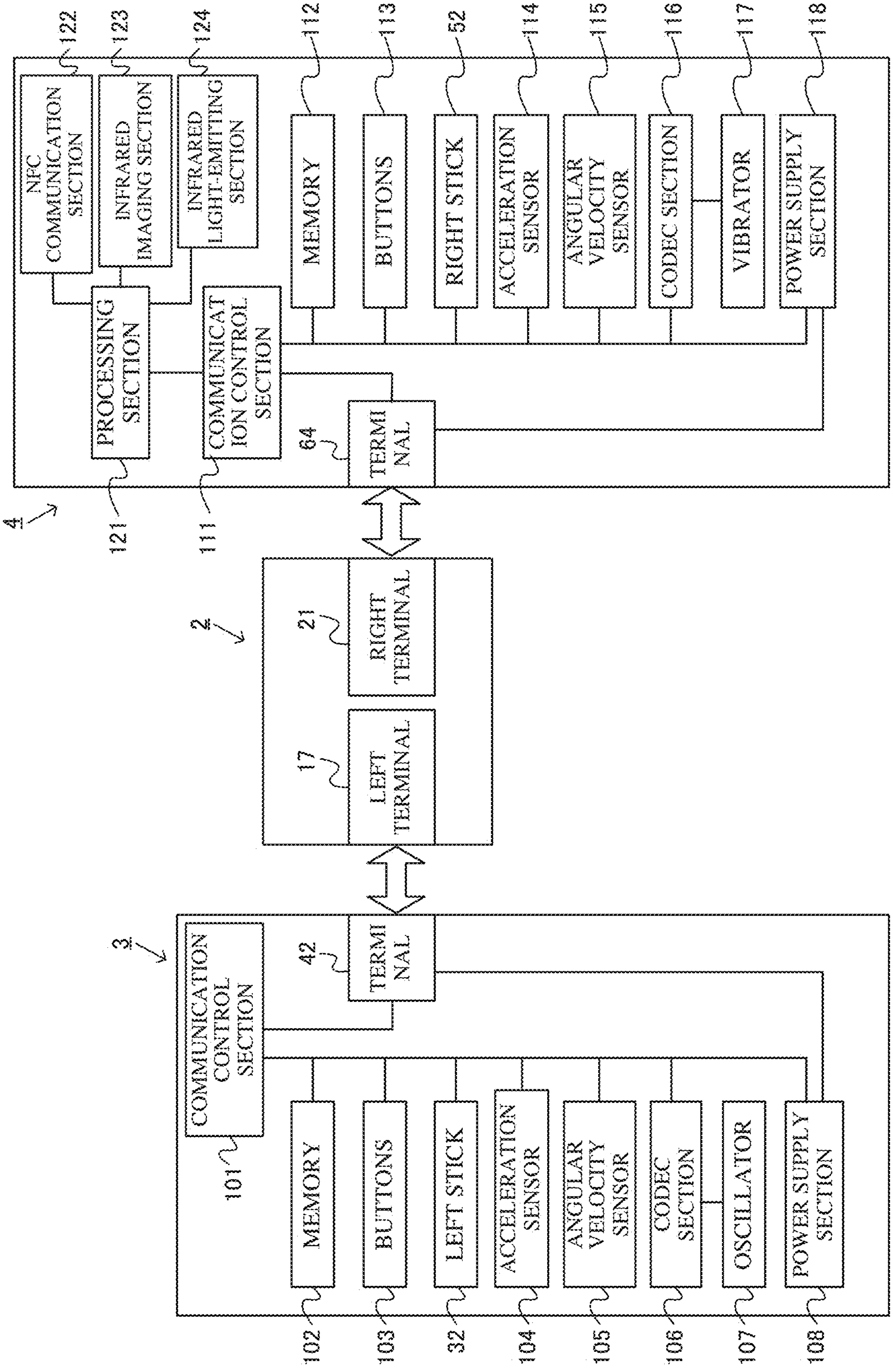
FIG. 3 is a block diagram showing a non-limiting example of the internal configurations of the main body apparatus 2, the left controller 3, and the right controller 4.

FIG. 3 is a block diagram showing examples of the internal configurations of the main body apparatus 2, the left controller 3, and the right controller 4. The details of the internal configuration of the main body apparatus 2 are shown in FIG. 2 and therefore are omitted in FIG. 3.

The left controller 3 includes a communication control section 101, which communicates with the main body apparatus 2. As shown in FIG. 3, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the left stick 32. Each of the buttons 103 and the left stick 32 outputs information regarding an operation performed on itself to the communication control section 101 repeatedly at appropriate timings.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., x, y, z axes shown in FIG. 4) directions. The acceleration sensor 104 may detect an acceleration along one axial direction or accelerations along two axial directions. In the exemplary embodiment, the angular velocity sensor 105 detects angular velocities about predetermined three axes (e.g., the x, y, z axes shown in FIG. 1). The angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are outputted to the communication control section 101 repeatedly at appropriate timings.

The communication control section 101 acquires information regarding an input (specifically, information regarding an operation or the detection result of the sensor) from each of input sections (specifically, the buttons 103, the left stick 32, and the sensors 104 and 105). The communication control section 101 transmits operation data including the acquired information (or information obtained by performing predetermined processing on the acquired information) to the main body apparatus 2. The operation data is transmitted repeatedly, once every predetermined time. The interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the left stick 32 on the basis of the operation data. Further, the main body apparatus 2 can calculate information regarding the motion and/or the orientation of the left controller 3 on the basis of the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 3, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the right stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

[Game Assumed in Exemplary Embodiment]

Next, the outline of game processing (example of information processing) executed by the game system 1 according to the exemplary embodiment will be described. The game assumed in the exemplary embodiment is such an action game that, in a virtual space (game space) in which various objects are placed, a player object (which may be referred to as "player character") which acts in accordance with an operation by a player (user) performs movement and the like to achieve a predetermined purpose, for example. Specifically, from a plurality of game stages (hereinafter, may be simply referred to as "stages"), the player selects a stage to be played, and plays an action game on the selected stage. The assumed game is not limited to an action game and may be another type of game (e.g., role-playing game).

[Outline of Game Processing in Exemplary Embodiment]

Figure 4:
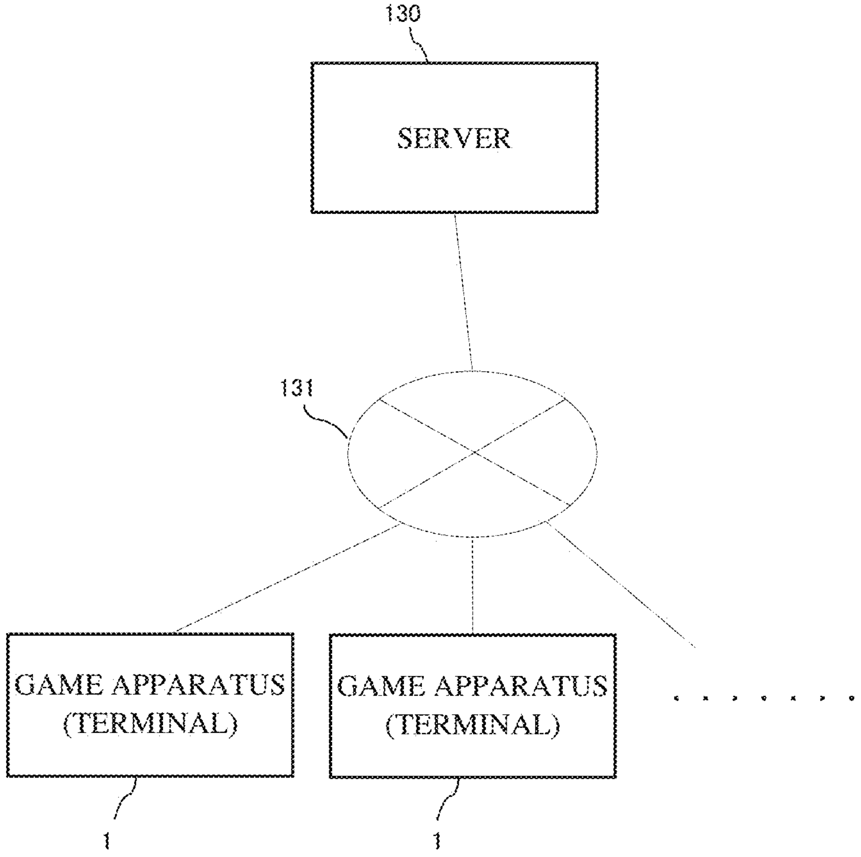
FIG. 4 illustrates a non-limiting example of a communication network.

FIG. 4 illustrates an example of a communication network according to the game processing. In this game processing, a plurality of game apparatuses (game system) 1 and a server 130 are connected so as to be able to communicate with each other via the Internet 131, and thus can execute a multiplay game. In this game processing, the multiplay game can be executed among a maximum of four players (a maximum of four game apparatuses). The plurality of game apparatuses 1 may be connected so as to communicate with each other through short-range wireless communication or the like not via the Internet 131, to execute a multiplay game.

In this game processing, an action and the like of a character placed in the virtual space are controlled in accordance with a player's operation, and the virtual space is imaged (drawn) by a virtual camera and then displayed on the screen (display 12), thus advancing the game. In this game processing, the player selects a desired stage and performs game play on the selected stage.

Figure 5:
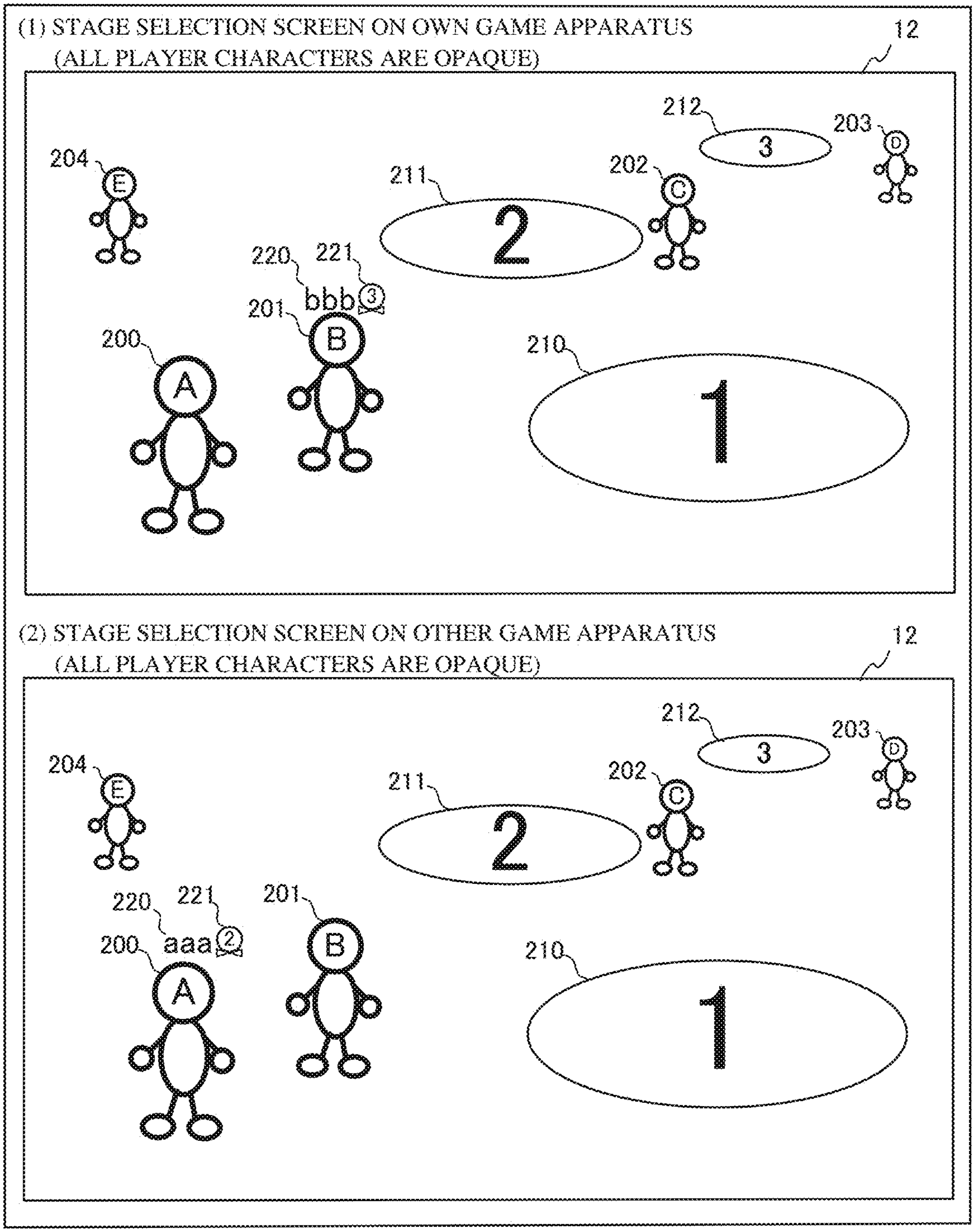
FIG. 5 illustrates a non-limiting example of a stage selection screen.

FIG. 5 illustrates a screen (may be referred to as "stage selection screen") for the player to select a stage to be played. In this game processing, in a virtual space (which may be referred to as "stage selection space") for each player to select a stage to be played, player characters which move on the ground in accordance with operations by respective players and circular areas (which may be referred to as "stage selection areas") for selecting stages are arranged, and the stage selection space is imaged (drawn) by the virtual camera from obliquely above and then displayed on the screen of each game apparatus 1. Then, each player moves the own operated player character to a desired stage selection area and performs a predetermined selection operation (e.g., presses a button), thereby starting a game on the stage corresponding to the stage selection area. In the stage selection space, player characters interfere and collide with each other (for example, when attempting to move to the same position). However, player characters may move through each other without interference.

FIG. 5(1) shows a stage selection screen on the game apparatus 1 (which may be referred to as "own game apparatus") operated by the player, and FIG. 5(2) shows a stage selection screen on the game apparatus 1 (which may be referred to as "other game apparatus") operated by another player. As shown in FIG. 5(1), on the stage selection screen on the own game apparatus, a player character (which may be referred to as "own player character") 200 operated by the player for the own game apparatus, player characters (which may be referred to as "other player characters") 201 to 204 operated by players for other game apparatuses, a stage selection area 210 for selecting a stage 1, a stage selection area 211 for selecting a stage 2, and a stage selection area 212 for selecting a stage 3, are displayed. For facilitating understanding, "A" is written on the own player character 200, and "B" to "E" are written on the other player characters 201 to 204. In this game processing, on the stage selection screen and a stage screen described later, a display area (drawing area) moves so that the own player character is included in the screen on the own game apparatus.

Then, as shown in FIG. 5(1), on the stage selection screen on the own game apparatus, in a case where another player character is in a predetermined range (e.g., within a radius of 2 meters in the virtual space) around the own player character 200, information (which may be referred to as "user information") 220 and 221 about the player for the other player character is displayed above the other player character. The user information 220 is a text indicating the name of the user (player) for the other player character (e.g., a desired name inputted by the user), and the user information 221 is an indication representing a medal on which the number of stages that the user has cleared in this game is written. The user information is not limited to the above example and may be any information about a user. In FIG. 5(1), since the other player character 201 is in the predetermined range around the own player character 200, the user information 220 and 221 is displayed at the other player character 201.

Next, as shown in FIG. 5(2), on the stage selection screen on the other game apparatus on which the other player character 201 is operated, the own player character 200 and the other player characters 201 to 204 are displayed. Then, on the stage selection screen on the other game apparatus on which the other player character 201 is operated, in a case where another player character is in a predetermined range (e.g., within a radius of 2 meters) around the other player character 201, user information 220 and 221 about said another player character is displayed above the said another player character. In FIG. 5(2), since the own player character 200 is in the predetermined range around the other player character 201, the user information 220 and 221 is displayed at the own player character 200.

As described above, on the stage selection screen, in a case where a player character of another player is located in a certain range from the player character operated by the player, user information about the other player is displayed. Thus, display of the screen is not complicated, while the player can see information about another player at a desired timing.

The user information 220 and 221 may be considered to be a part of the player character. That is, it may be considered that the display manner of the player character is changed with the user information 220 and 221 displayed.

Figure 6:
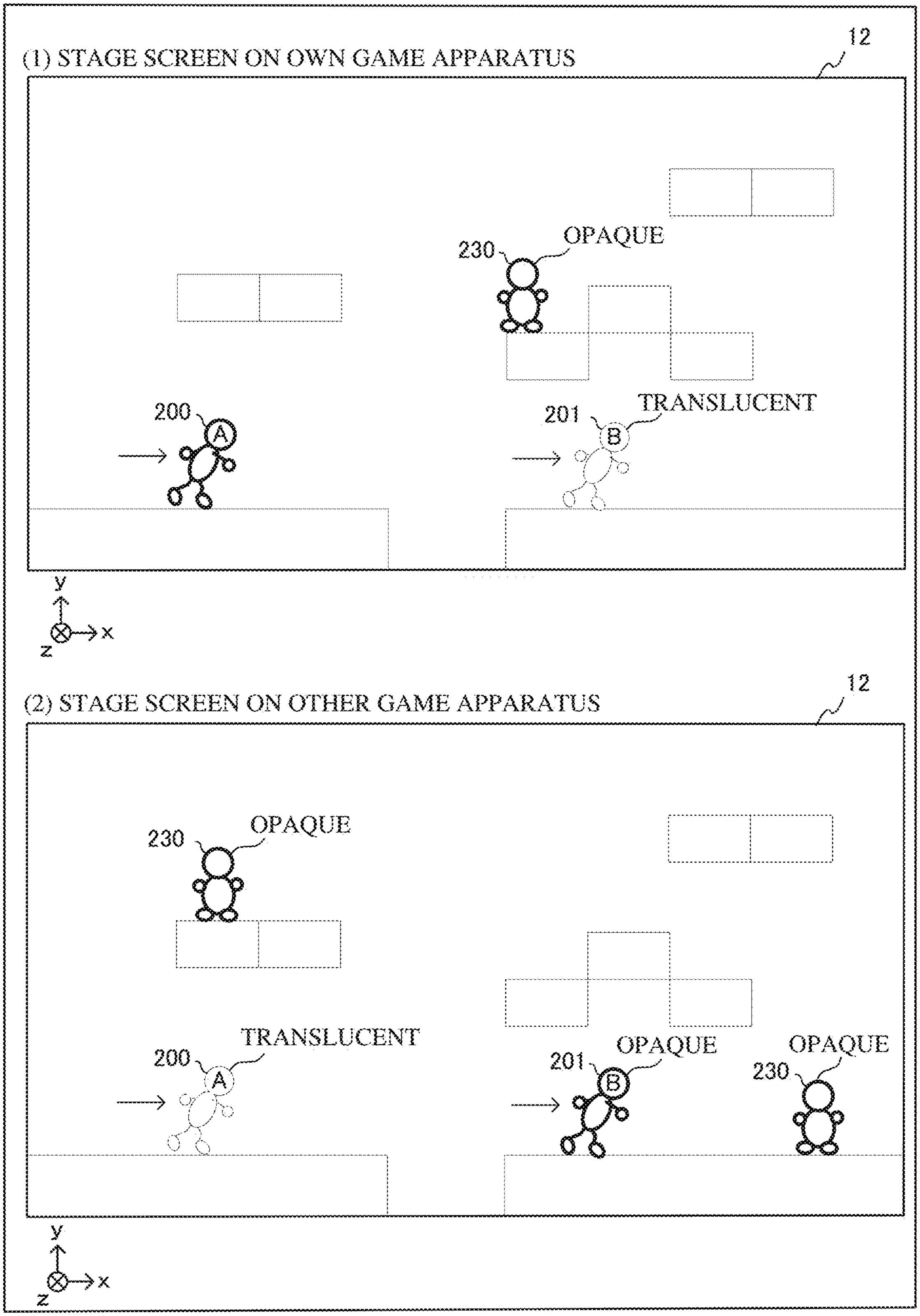
FIG. 6 illustrates a non-limiting example of a game screen.

FIG. 6 illustrates a screen (which may be referred to as "stage screen") of a game stage selected on the stage selection screen described with reference to FIG. 5. In this game processing, multiple stages are provided, and on each game apparatus, virtual spaces (which may be referred to as "stage spaces") corresponding to the respective stages are provided. In this game processing, each of the multiple stages (stage spaces) has the same structure (configuration) among the game apparatuses. For example, a first stage provided in a first game apparatus and a first stage provided in a second game apparatus have the same structure (configuration), and a second stage provided in the first game apparatus and a second stage provided in the second game apparatus have the same structure (configuration). Regarding at least one stage of the multiple stages, the stage may have similar structures among the game apparatuses.

On the stage selection screen described with reference to FIG. 5, if the player selects a stage, the scene of the game shifts to the stage, and the player character of the player, objects such as blocks and terrains forming the stage, enemy characters, and the like are placed in the stage space of the selected stage (the stage space in the game apparatus operated by the player). Then, the stage space is imaged (drawn) by the virtual camera directly from a lateral side, and is displayed on the screen of each game apparatus. Then, the player operates the player character to perform movement or the like, thereby playing on the stage, and when a predetermined stage completion condition is satisfied, play on the stage is finished. Hereinafter, description will be given specifically.

FIG. 6(1) shows an example of the stage screen on the own game apparatus, and FIG. 6(2) shows an example of the stage screen on another game apparatus on which the game is played at the same stage (the stage having the same structure) at the same time. As shown in FIG. 6(1), the own player character 200 operated by the player for the own game apparatus, one enemy character 230, and the other player character 201 operated on the other game apparatus (by the other player), are displayed on the stage screen on the own game apparatus, while the game advances.

Here, other player characters including the other player character 201 are not placed as actual bodies in the stage space in the own game apparatus, but are displayed in a superimposed state when the stage screen on the own game apparatus is drawn. Therefore, in the stage space in the own game apparatus, the other player characters do not interfere with an object in this stage space. Here, while the other player characters are placed in the stage space in the own game apparatus, control such as eliminating collision detection for the other player characters may be performed so that the other player characters do not interfere with an object in the stage space. As shown in FIG. 6(1), on the stage screen on the own game apparatus, other player characters including the other player character 201 are displayed translucently. As a method for displaying another player character translucently, the degree of transparency may be set. As another method for displaying another player character translucently, pixels drawn opaquely may be set to include blank points at regular intervals so as to appear translucent. On the other hand, as shown in FIG. 6(2), on the stage screen on the other game apparatus, the other player character 201 operated by the player for the other game apparatus, two enemy characters 230, and the own player character 200 operated on the own game apparatus (see FIG. 6(1)), are displayed, while the game advances.

Here, in the stage space in the other game apparatus, other player characters including the own player character 200 shown in FIG. 6(1) are not placed as actual bodies, but are displayed in a superimposed state when the stage screen on the other game apparatus is drawn. Therefore, in the stage space in the other game apparatus, other player characters including the own player character 200 do not interfere with an object in this stage space. Here, while other player characters are placed in the stage space in the other game apparatus, control such as eliminating collision detection for the other player characters may be performed so that the other player characters do not interfere with an object in the stage space. As shown in FIG. 6(2), on the stage screen on the other game apparatus, other player characters including the own player character 200 shown in FIG. 6(1) are displayed translucently. As a method for displaying another player character translucently, the degree of transparency may be set. As another method for displaying another player character translucently, pixels drawn opaquely may be set to include blank points at regular intervals so as to appear translucent.

In this game processing, as shown in FIG. 6(1) and FIG. 6(2), on the stage screen on each game apparatus, a player character operated by another player is displayed at a corresponding position and in a corresponding posture, whereby multiplay can be performed.

On each stage of this game, the own player character, another player character, and an enemy character can move in leftward, rightward, upward, and downward directions and cannot move in directions toward a near side and a deep side. That is, each character can move on an xy plane shown in FIG. 6. In each stage of this game, the own player character can break a block or the like by its body hitting the block by a jump or the like, and if the player makes a mistake such as contacting with the enemy character 230, the player character disappears after elapse of a predetermined period (e.g., 5 seconds), thus failing to clear the stage. If a predetermined condition that the own player character obtains a specific item or reaches a goal point is satisfied, the stage is successfully cleared.

Figure 7:
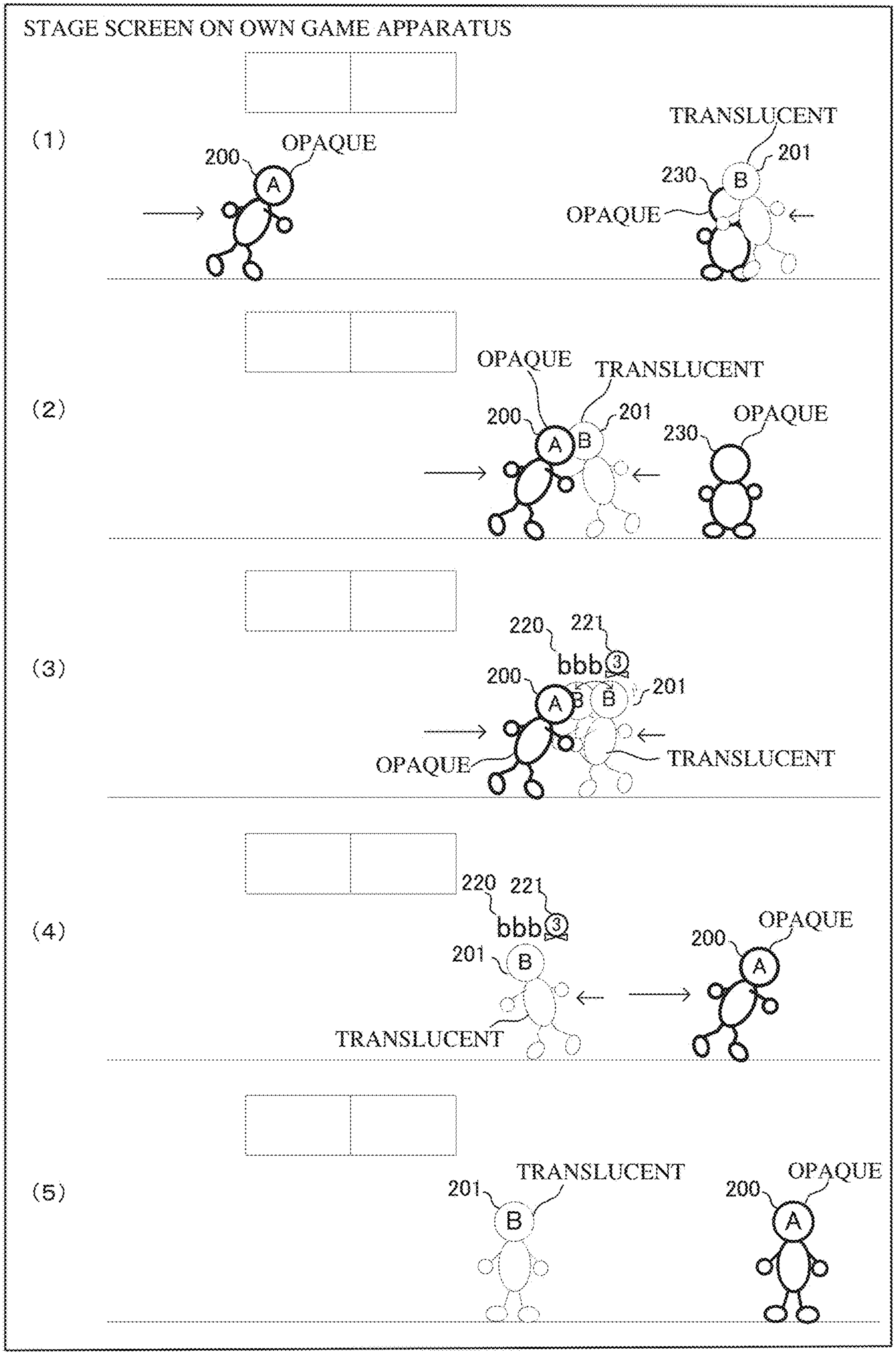
FIG. 7 illustrates a non-limiting example of a game screen.

FIG. 7 illustrates a case where the own player character contacts with (overlaps) another player character on the stage screen on the own game apparatus. In this game processing, on the stage screen on the own game apparatus, another player character does not interfere with an object (the own player character, an enemy character, a block, a terrain, or the like) placed in the stage space in the own game apparatus. In this game processing, on the stage screen on the own game apparatus, when the own player character and another player character overlap (contact with) each other, the other player character sways and user information about the other player character is displayed. Hereinafter, description will be given specifically.

In a case where the own player character 200 and the other player character 201 come close to each other as shown in FIG. 7(1) and then the own player character 200 and the other player character 201 come into contact with (overlap) each other as shown in FIG. 7(2), the other player character 201 is displayed so as to sway and the user information 220 and 221 about the other player operating the other player character 201 is displayed, as shown in FIG. 7(3). Here, as described above, the other player character 201 is displayed translucently on the stage screen of the own game apparatus, but the user information 220 and 221 is displayed opaquely. As shown in FIG. 7(2), the other player character 201 moves through the enemy character 230 without interfering with the enemy character 230 which is an object placed in the stage space in the own game apparatus. At this time, also on the stage screen on the other game apparatus on which the other player character 201 is operated, the own player character 200 and the other player character 201 contact with (overlap) each other, but such display that the other player character 201 sways is not performed and the user information 220 and 221 is not displayed. Instead, on the stage screen on the other game apparatus, the own player character 200 is displayed so as to sway and the user information about the own player character is displayed.

Then, as shown in FIG. 7(4), during a predetermined period (e.g., 3 seconds) from when overlap (contact) between the own player character 200 and the other player character 201 has ended, the user information 220 and 221 continues being displayed, and thereafter, display of the user information 220 and 221 ends as shown in FIG. 7(5).

By performing control as described above, it is possible to prevent the stage screen from becoming complicated and hard to see, and the player can see user information about another player character by bringing the own player character into contact with the other player character at a desired timing.

Figure 8:
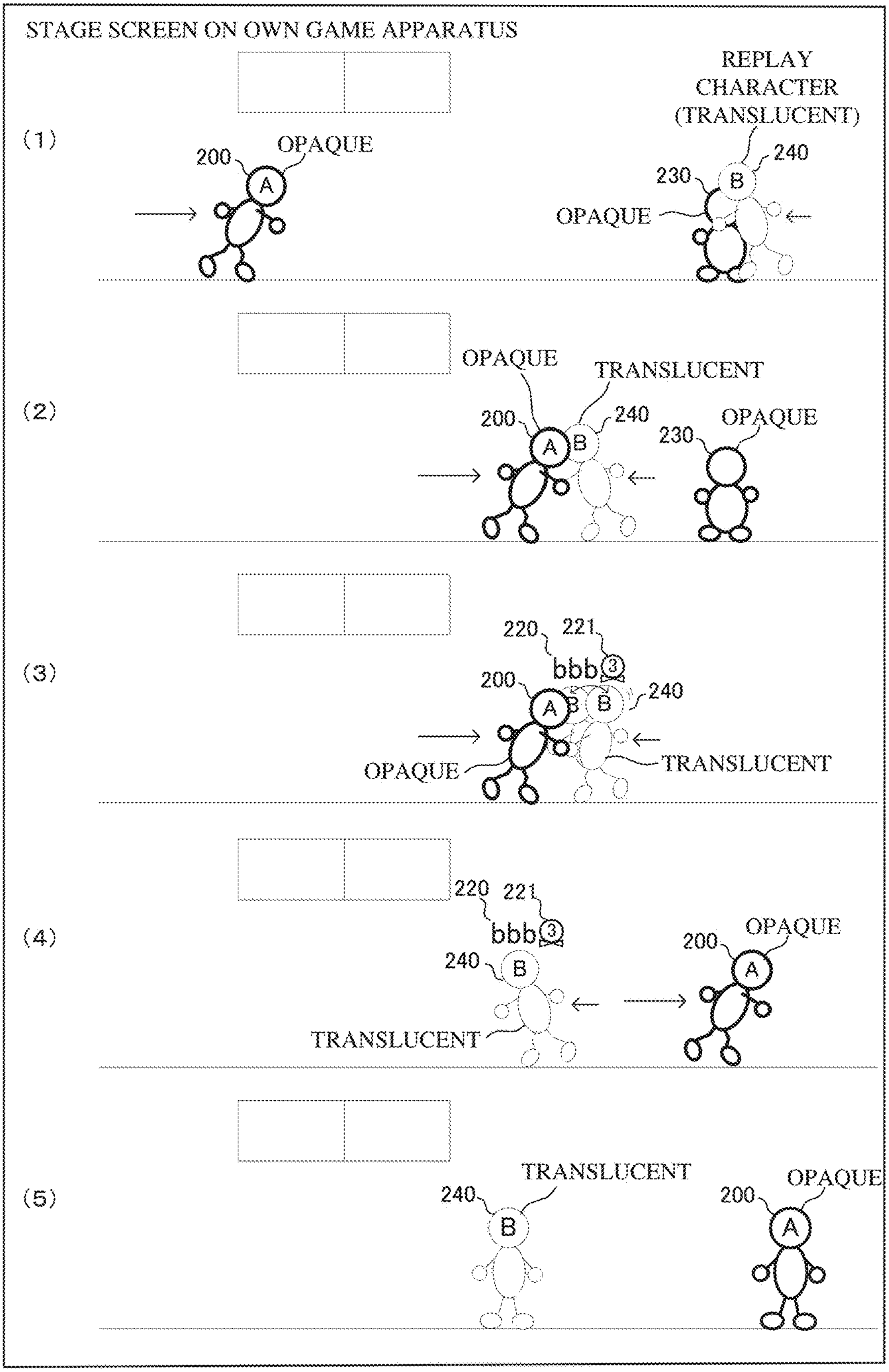
FIG. 8 illustrates a non-limiting example of a game screen.

FIG. 8 illustrates a case where the own player character contacts with (overlaps) a replay character (which may be simply referred to as "replay character") for another player character on the stage screen on the own game apparatus. The replay character is a character that performs the same movement as the other player character on the basis of an operation record for the other player character operated by the other player in the past. Therefore, the replay character is different from a character subjected to movement control or the like in real time like another player character. By the replay character being displayed, the player can play with a feeling of performing multiplay even when another player is not playing on the same stage. Data for displaying the replay character is provided to the own game apparatus from the server 130 (see FIG. 4), for example.

On the stage screen on the own game apparatus, the replay character is subjected to the same control as the other player character (see FIG. 7). Specifically, the replay character does not interfere with an object (the own player character, an enemy character, a block, a terrain, or the like) placed in the stage space in the own game apparatus. On the stage screen on the own game apparatus, when the own player character and the replay character overlap (contact with) each other, the replay character sways and user information about the replay character is displayed. Hereinafter, description will be given more specifically.

In a case where the own player character 200 and the replay character 240 come close to each other as shown in FIG. 8(1) and then the own player character 200 and the replay character 240 contact with (overlap) each other as shown in FIG. 8(2), the replay character 240 is displayed so as to sway and the user information 220 and 221 about the replay character 240 (i.e., user information about the other player character operated in the past) is displayed, as shown in FIG. 8(3). Here, on the stage screen on the own game apparatus, the replay character 240 is displayed translucently as with the other player character 201 (see FIG. 7), but the user information 220 and 221 is displayed opaquely. In addition, as shown in FIG. 8(2), the replay character 240 moves through the enemy character 230 without interfering with the enemy character 230 which is an object placed in the stage space in the own game apparatus.

Then, as shown in FIG. 8(4), during a predetermined period (e.g., 3 seconds) from when overlap (contact) between the own player character 200 and the replay character 240 has ended, the user information 220 and 221 continues being displayed, and thereafter, display of the user information 220 and 221 ends as shown in FIG. 8(5). In FIG. 8, the display manner of the replay character is the same as that of the other player character which is the origin thereof. However, the display manner may be different in order to indicate that the character is a replay character.

Figure 9:
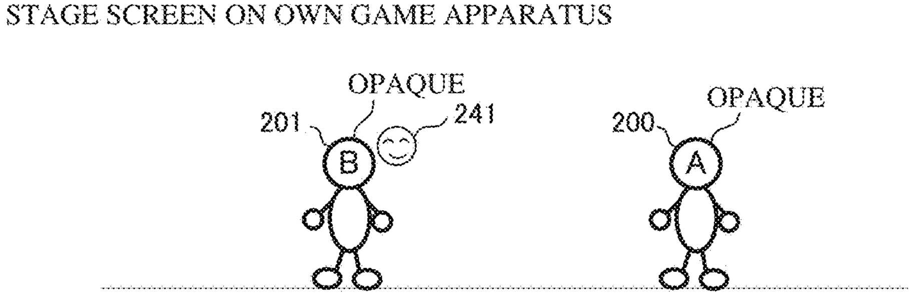
FIG. 9 illustrates a non-limiting example of a game screen.

FIG. 9 illustrates an emotion indication. In this game, by performing a predetermined operation, the player can impart the own player character with an emotion indication so that the emotion indication is displayed on the stage screen on the own game apparatus and the stage screen on another game apparatus of a multiplay competitor. The emotion indication is an indication showing a human's expression (face) such as a smiley expression, a tired expression, or an angry expression, and it is possible to show an expression to another player by displaying an emotion indication. Hereinafter, description will be given specifically.

As shown in FIG. 9, when a player of another game apparatus, i.e., a multiplay competitor, provides an emotion indication of a smiley expression for the other player character 201, a smiley emotion image 241 is displayed opaquely on a side of the other player character 201 on the stage screen on the own game apparatus. Here, on the stage screen on the own game apparatus, the other player character 201 which would be displayed translucently in a normal case is displayed opaquely during a period in which the emotion image 241 is displayed (opaquely displayed) for the other player character 201. Although not shown, also in a case where the player provides an emotion indication for the own player character 200, the emotion indication is displayed for the own player character 200 in the same manner on the stage screen on the other game apparatus of the multiplay competitor.

Figure 10:
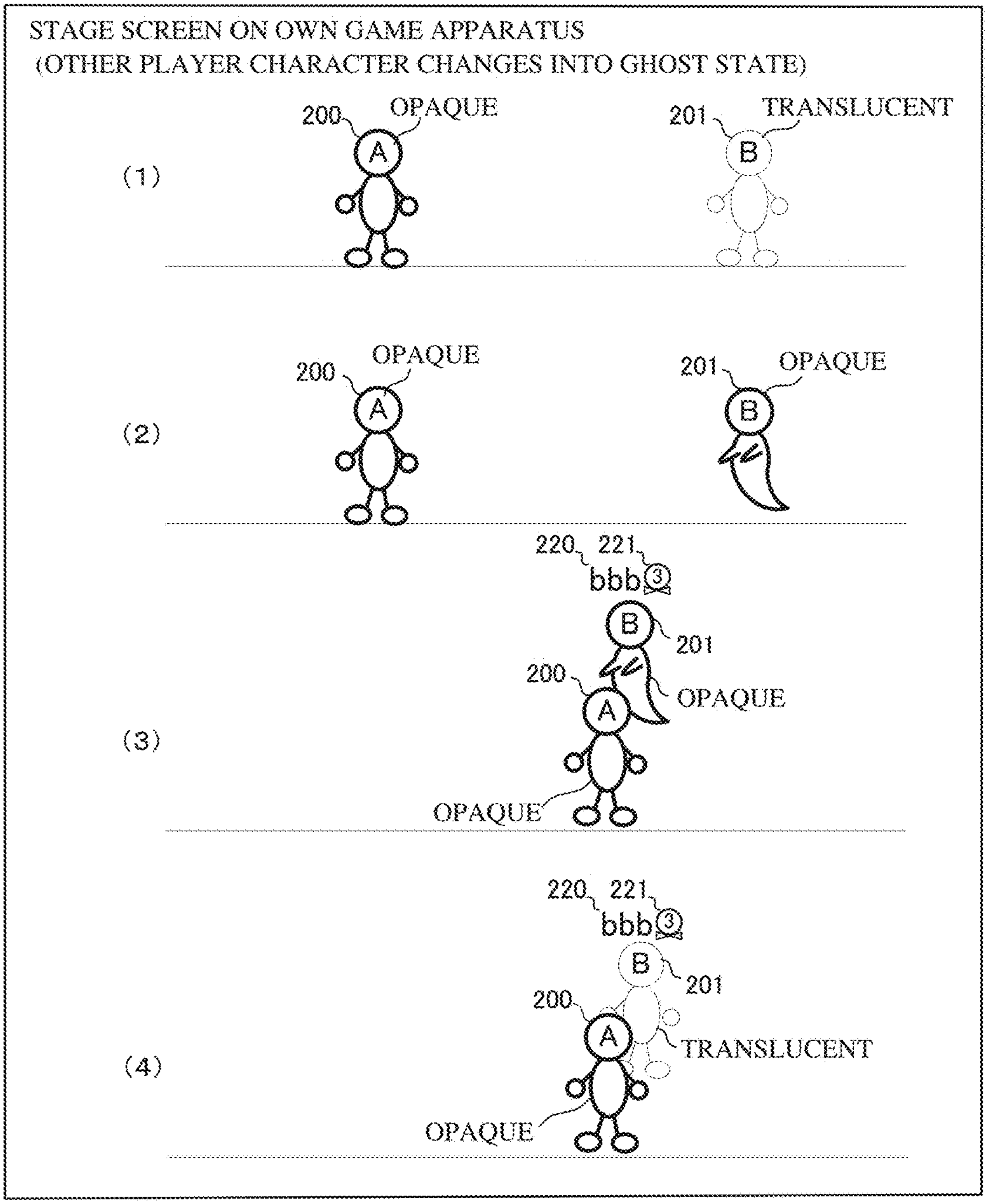
FIG. 10 illustrates a non-limiting example of a game screen.

FIG. 10 illustrates a case where another player character comes into a ghost state on the stage screen on the own game apparatus. The ghost state is a state into which the player character comes when making a mistake such as contacting with an enemy character, and the player character is to disappear from the stage when a predetermined period (e.g., 5 seconds) elapses from when the player character has come into the ghost state. The player character in the ghost state can fly, and can recover from the ghost state into the original state by contacting with the other player character or the replay character, whereby the player character can avoid disappearing. Hereinafter, description will be given specifically.

First, as shown in FIG. 10(1), on the stage screen on the own game apparatus, the own player character 200 and the other player character 201 which is translucent are displayed. Next, in a case where the other player character 201 makes a mistake and comes into a ghost state in the stage space for the other player character 201 (on the stage screen on the other game apparatus; not shown), as shown in FIG. 10(2), the other player character 201 changes into a ghost state and becomes opaque on the stage screen on the own game apparatus.

Next, when the other player character 201 moves and comes into contact with the own player character 200 in the stage space for the other player character 201 in accordance with an operation by the other player (not shown), as shown in FIG. 10(3), the other player character 201 in the ghost state moves in the same manner on the stage screen on the own game apparatus, to come into contact with the own player character 200. Then, in the stage space for the other player character 201, the other player character 201 recovers into the original state (not shown) owing to the contact with the own player character 200, and in addition, as shown in FIG. 10(4), on the stage screen on the own game apparatus, the other player character 201 in the ghost state recovers into the original state in the same manner owing to the contact with the own player character 200, thus returning to be translucent. Here, as shown in FIG. 10(3), since the other player character 201 and the own player character 200 contact with each other, user information 220 and 221 is displayed (opaquely displayed) at the other player character 201 in the ghost state.

Figure 11:
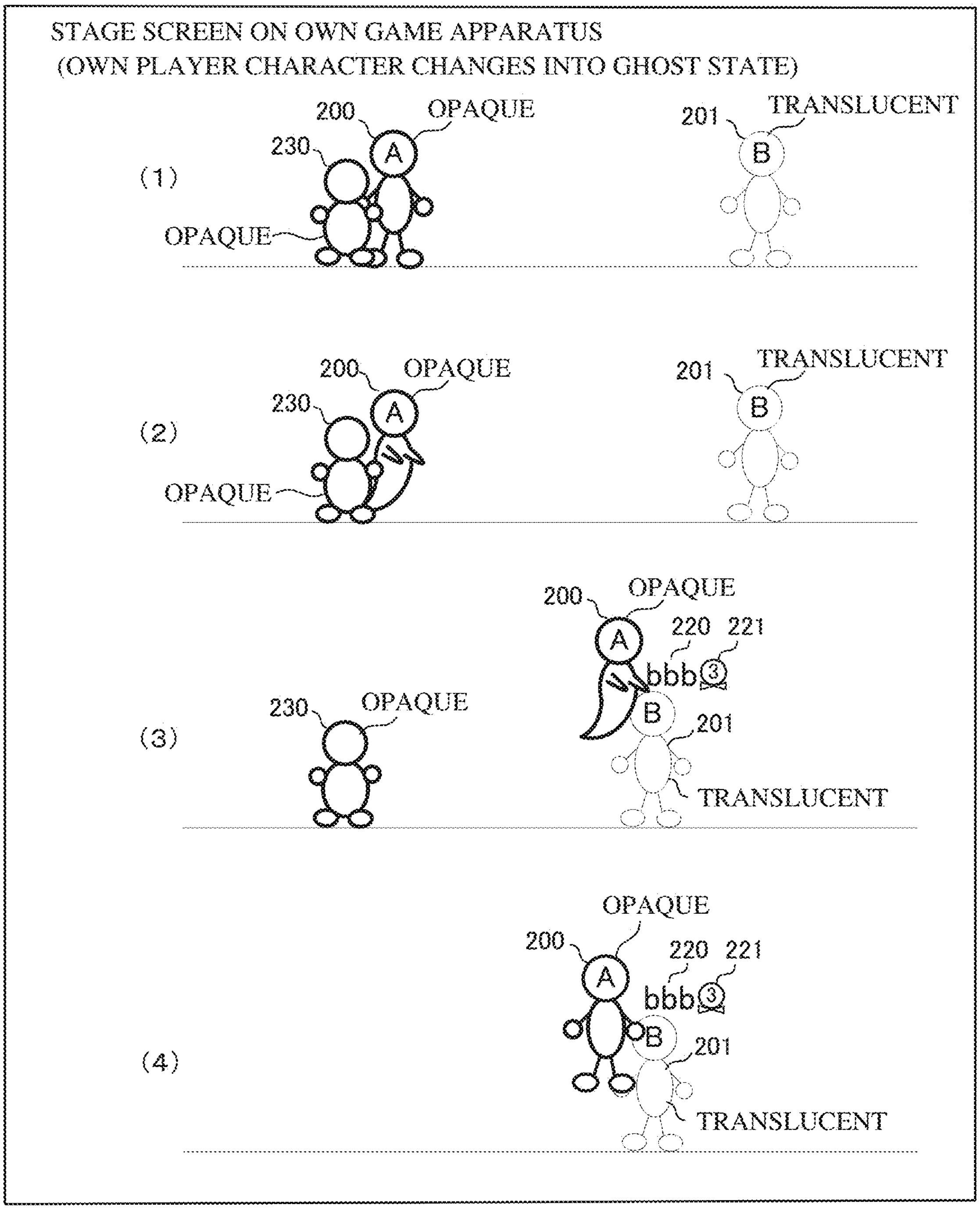
FIG. 11 illustrates a non-limiting example of a game screen.

FIG. 11 illustrates a case where the own player character comes into a ghost state on the stage screen on the own game apparatus. Hereinafter, description will be given specifically.

First, as shown in FIG. 11(1), on the stage screen on the own game apparatus, the own player character 200 and the other player character 201 which is translucent are displayed, and the own player character 200 makes a mistake to contact with the enemy character 230. Next, as shown in FIG. 11(2), due to the mistake, the own player character 200 changes into a ghost state on the stage screen on the own game apparatus. Characters that can be displayed translucently on the stage screen on the own game apparatus are another player character and a replay character, and the own player character is not displayed translucently even when being in a ghost state.

Next, as shown in FIG. 11(3), on the stage screen on the own game apparatus, when the own player character 200 and the other player character 201 come into contact with each other, the own player character 200 recovers from the ghost state into the original state as shown in FIG. 11(4). Here, as shown in FIG. 11(3) and FIG. 11(4), on the stage screen on the own game apparatus, since the own player character 200 and the other player character 201 contact with each other, user information 220 and 221 is displayed at the other player character 201.

Figure 12:
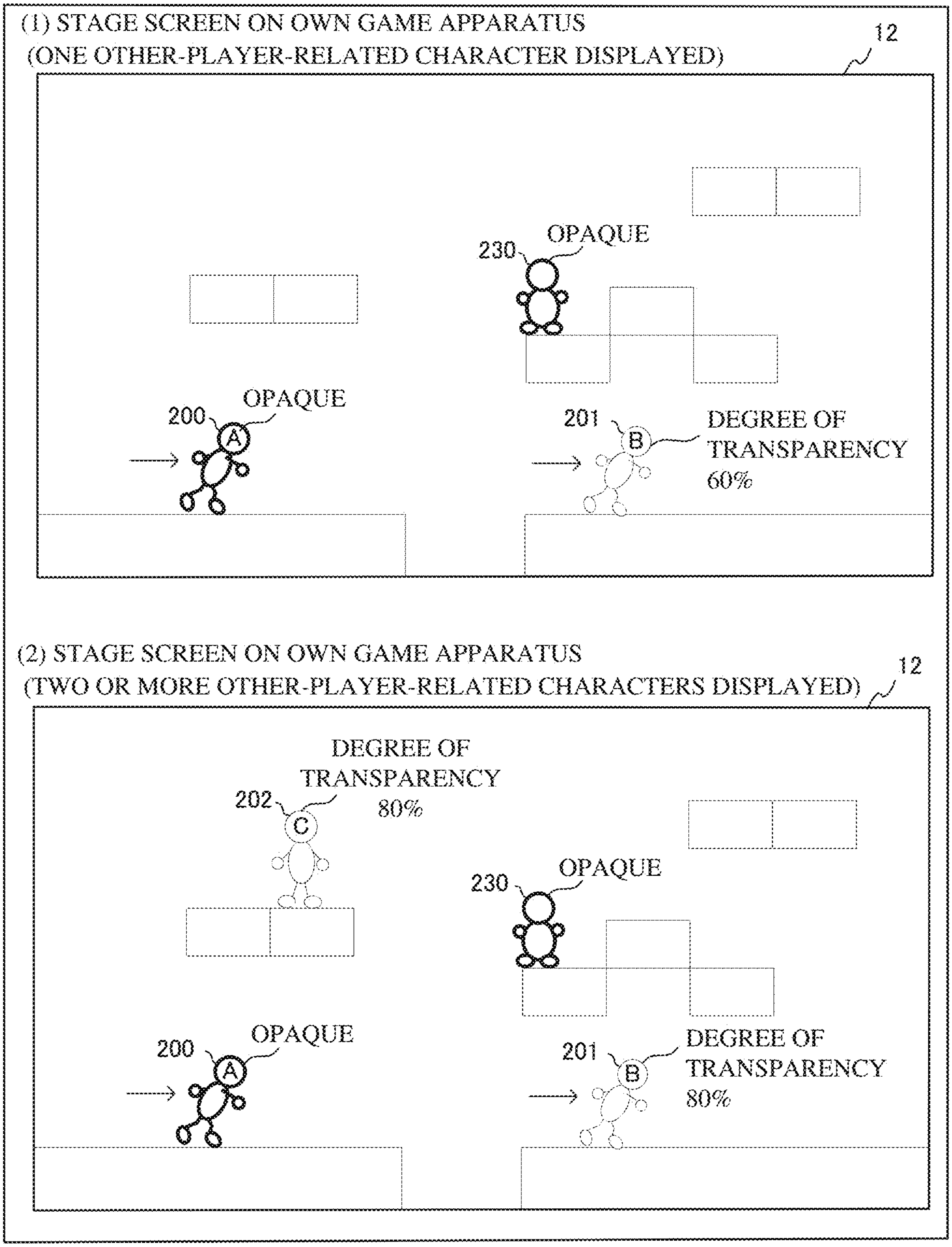
FIG. 12 illustrates a non-limiting example of a game screen.
Figure 13:
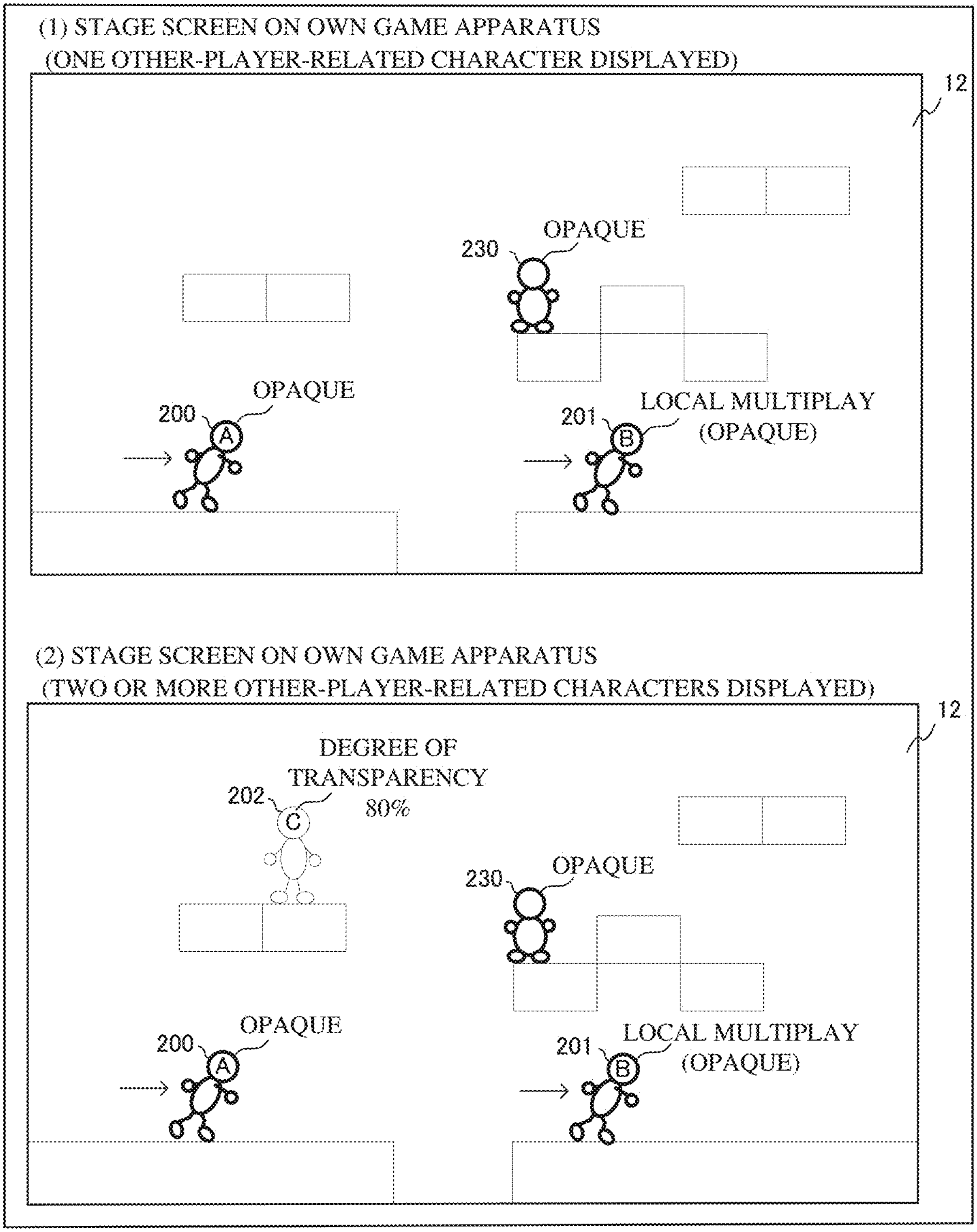
FIG. 13 illustrates a non-limiting example of a game screen.

FIG. 12 and FIG. 13 illustrate such control that, on the stage screen on the own game apparatus, the degrees of translucency of other-player-related characters displayed in the screen are changed in accordance with the number of player-related characters displayed in the same screen. The player-related character is a character that acts on the basis of an operation by a player, and is any of the own player character, the other player character, and the replay character. The other-player-related character is a character that acts on the basis of an operation by another player, and is either of the other player character and the replay character. Hereinafter, description will be given specifically.

As shown in FIG. 12(1), in a case where the own player character 200 and the other player character 201 are displayed on the stage screen on the own game apparatus (i.e., one other-player-related character is displayed in the screen), the other player character 201 which is translucent is displayed at a degree of transparency of 60%. On the other hand, as shown in FIG. 12(2), in a case where the own player character 200, the other player character 201, and the other player character 202 are displayed on the stage screen on the own game apparatus (i.e., two other-player-related characters are displayed in the screen), the other player character 201 and the other player character 202 which are translucent are displayed at a degree of transparency of 80%.

Although not shown, also in a case where the own player character 200 and more than two other player characters are displayed on the stage screen on the own game apparatus (i.e., three or more other-player-related characters are displayed in the same screen), the other player character which is translucent is displayed at a degree of transparency of 80%. Here, when the degree of transparency of an other-player-related character is switched from 60% to 80% or switched from 80% to 60%, the degree of transparency is gradually changed (linearly or stepwise).

FIG. 13 illustrates a case where the other player character 201 is a character in local multiplay, in the case of FIG. 12. The local multiplay is such multiplay that a plurality of players connect to one main body apparatus 2 (see FIG. 1) using their respective controllers 3 and the like and operate their respective player characters. The other player characters 201 and 202 in FIG. 12 are not characters in local multiplay but characters in multiplay using communication through the Internet, short-range wireless communication, or the like (which may be referred to as "remote multiplay"). Here, another player character in local multiplay is not displayed translucently, unlike another player character in remote multiplay. Hereinafter, description will be given specifically.

As shown in FIG. 13(1), in a case where the own player character 200 and the other player character 201 in local multiplay are displayed on the stage screen on the own game apparatus (i.e., one other-player-related character is displayed in the screen), the other player character 201 is displayed opaquely. That is, another player character in local multiplay is displayed opaquely. Meanwhile, as shown in FIG. 13(2), in a case where the own player character 200, the other player character 201 in local multiplay, and the other player character 202 in remote multiplay are displayed on the stage screen on the own game apparatus (i.e., two other-player-related characters are displayed in the screen), the other player character 202 in remote multiplay, which is translucent, is displayed at a degree of transparency of 80%.

Although not shown, also in a case where the own player character 200, the other player character 201 in local multiplay, and more than one other player character in remote multiplay is displayed on the stage screen on the own game apparatus (i.e., three or more other-player-related characters are displayed in the screen), the other player characters in remote multiplay, which are translucent, are displayed at a degree of transparency of 80%.

As described above, in this game processing, when the number of other-player-related characters displayed on the stage screen increases (becomes two or more), the degree of transparency of the other-player-related character displayed translucently is increased, whereby the screen can be prevented from becoming complicated and hard to see. The degree of transparency of an other-player-related character will be described in detail later, with reference to FIG. 22.

Figure 14:
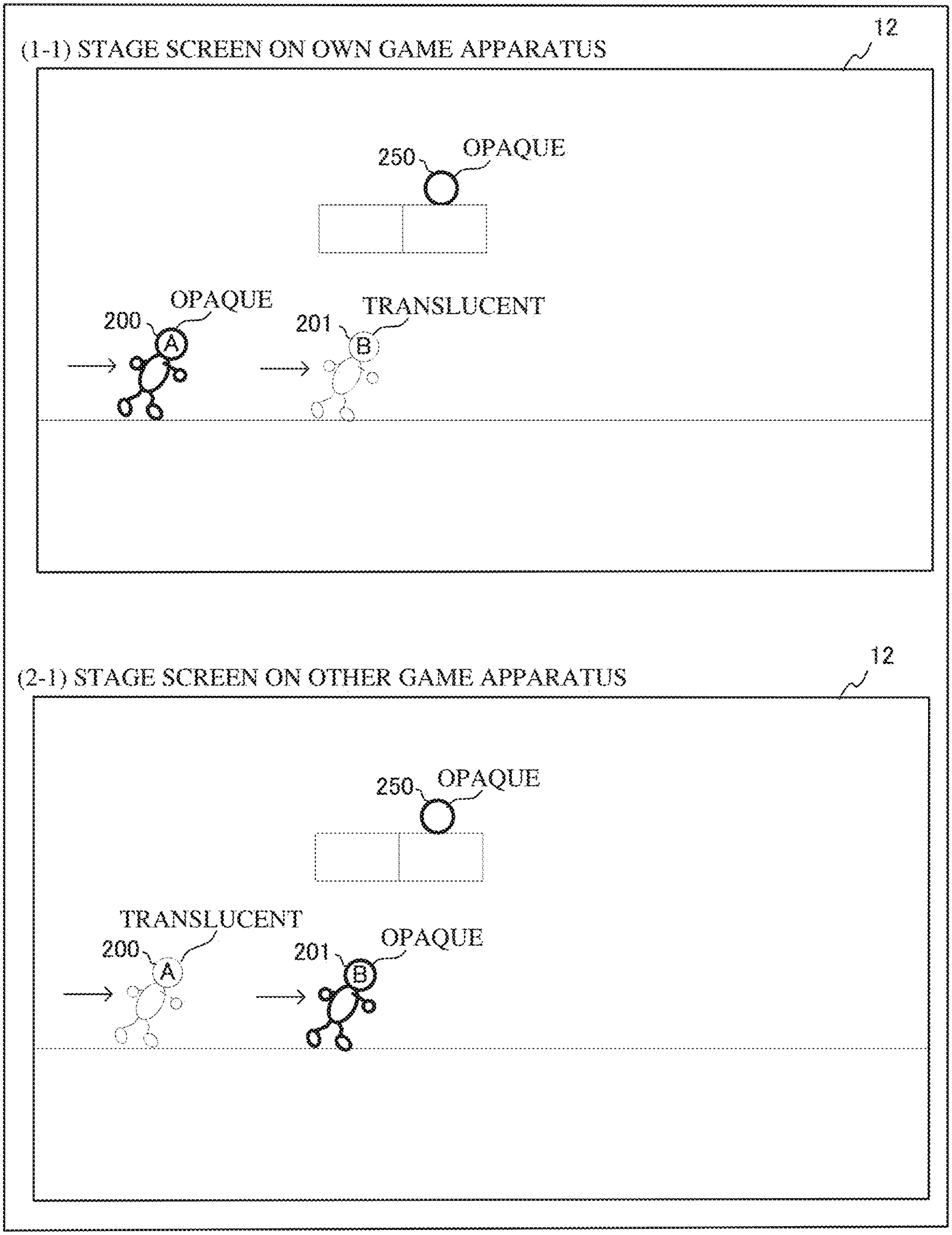
FIG. 14 illustrates a non-limiting example of a game screen.
Figure 15:
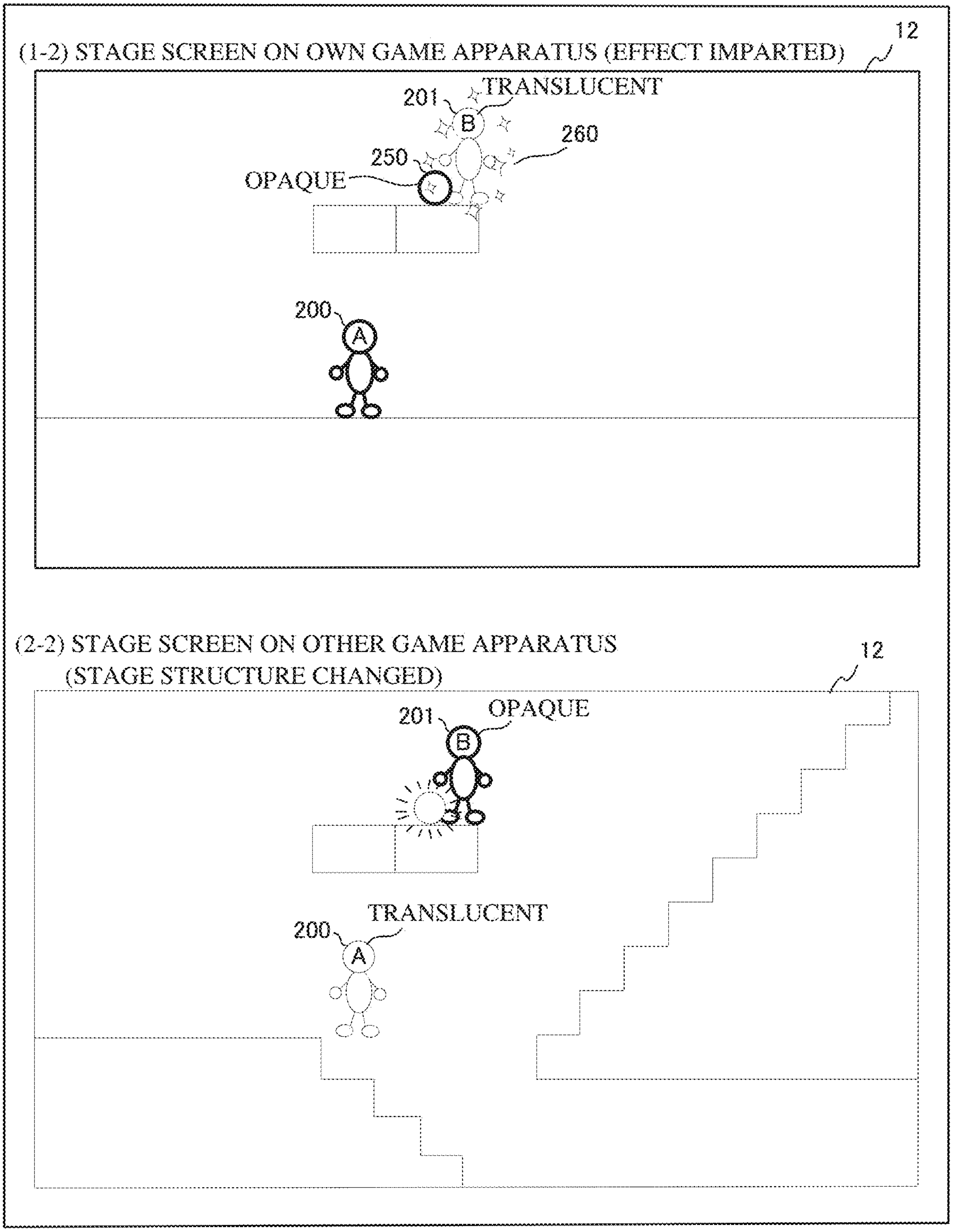
FIG. 15 illustrates a non-limiting example of a game screen.
Figure 16:
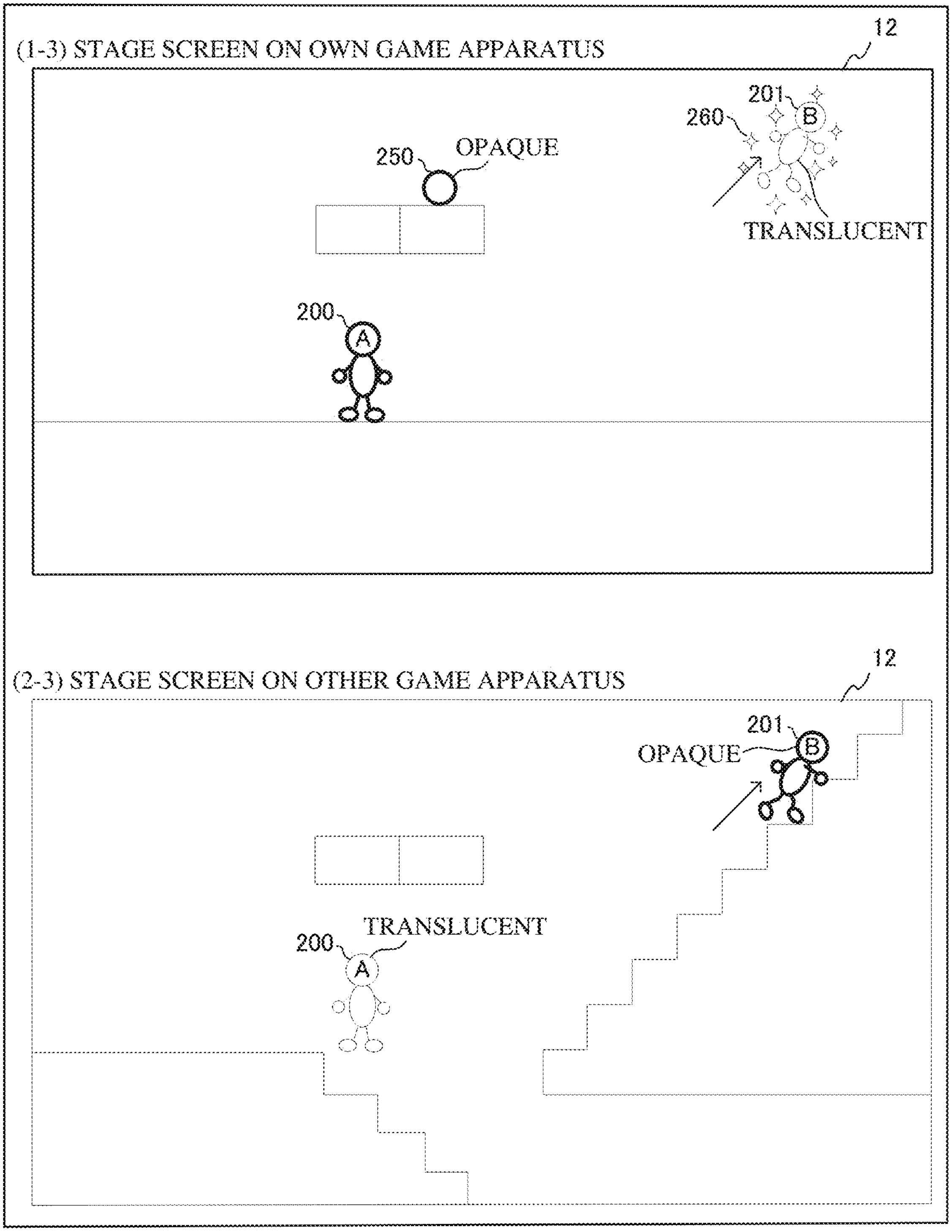
FIG. 16 illustrates a non-limiting example of a game screen.

FIG. 14 to FIG. 16 illustrate such control that, in a case where the stage screen on the other game apparatus (the stage space in the other game apparatus) of a multiplay competitor is changed from a first structure to a second structure (which may be referred to as "stage structure change"), an effect image is imparted to the other player character on the stage screen on the own game apparatus. In FIGS. 14, (1-1) and (2-1) show the stage screen on the own game apparatus and the stage screen on the other game apparatus at the same timing, and in FIGS. 15, (1-2) and (2-2) show the stage screen on the own game apparatus and the stage screen on the other game apparatus at the same subsequent timing. Then, in FIGS. 16, (1-3) and (2-3) show the stage screen on the own game apparatus and the stage screen on the other game apparatus at the same timing afterward. Hereinafter, description will be given specifically with reference to FIG. 14 to FIG. 16.

First, as shown in FIG. 14(1-1), on the stage screen on the own game apparatus, the own player character 200 and the other player character 201 which is translucent are displayed. Meanwhile, as shown in FIG. 14(2-1), at the same timing, the other player character 201 and the own player character 200 which is translucent are displayed on the stage screen on the other game apparatus. In addition, on the stage screen on the own game apparatus (the stage space in the own game apparatus) and the stage screen on the other game apparatus (the stage space having the same structure in the other game apparatus), an item 250 is placed at corresponding positions (the same position).

When the own player character 200 has obtained an item 250 in the stage space in the own game apparatus (see FIG. 14(1-1)), the structure of the stage space in the own game apparatus is changed from the first structure to the second structure (not shown). In addition, as described later with reference to FIG. 15(2-2) and FIG. 16(2-3), when the other player character 201 has obtained the item 250 in the stage space in the other game apparatus (see FIG. 14(2-1)), the structure of the stage space in the other game apparatus is changed. Here, the manner of structure change in the stage space due to the item 250 being obtained is the same between the stage space in the own game apparatus and the stage space in the other game apparatus.

Next, as shown in FIG. 15(2-2), on the stage screen on the other game apparatus (the stage space in the other game apparatus), when the other player character 201 has moved to contact with the item 250 and thus has obtained the item 250, the stage space in the other game apparatus is changed from the first structure (before change) to the second structure (after change), so that stairs ascending to an upper area, an underground space, and stairs descending into the underground space, appear and thus the movable range of the character changes. Although not shown, also in a case where the own player character 200 has obtained the item 250, the same structure change occurs in the stage space in the own game apparatus.

Meanwhile, as shown in FIG. 15(1-2), on the stage screen on the own game apparatus, the other player character 201 moves along with the above-described movement of the other player character 201 in the stage space in the other game apparatus. Then, as shown in FIG. 15(1-2), an effect image 260 is imparted to the other player character 201, to suggest that the structure of the stage space in the other game apparatus has changed. Thus, the player for the own game apparatus can know that the other player character 201 has obtained the item 250 and the structure of the stage space for the other player character 201 is changed. Therefore, it is preferable that the effect image 260 is imparted only when the item 250 is obtained by a player character. Here, as shown in FIG. 15(2-2), on the stage screen on the other game apparatus, the own player character 200 is displayed at a position corresponding to the position of the own player character 200 in FIG. 15(1-2).

Next, as shown in FIG. 16(2-3), on the stage screen on the other game apparatus (the stage space in the other game apparatus), the other player character 201 ascends the stairs ascending to an upper area, and meanwhile, as shown in FIG. 16(1-3), on the stage screen on the own game apparatus, the other player character 201 imparted with the effect image 260 ascends in the air along with movement of the other player character 201 in the stage space in the other game apparatus. From this scene, the player for the own game apparatus can imagine a behavior (action) of the own player character 200 that will be enabled by obtaining the item 250.

In the above description, the case where structure change occurs on the stage screen on the other game apparatus (the stage space in the other game apparatus) has been described. However, the same control is performed also in a case where structure change occurs on the stage screen on the own game apparatus (the stage space in the own game apparatus).

The stage state change is not limited to that described with reference to FIG. 14 to FIG. 16. For example, stage structure change may be such change that at least a part of a terrain in the stage space comes into a moving state from a fixed state. As another example, stage structure change may be such change that an underwater area and a non-underwater area in the stage space is switched to each other. As still another example, stage structure change may be such change that the gravity acting direction is changed.

[Details of Information Processing in Exemplary Embodiment]

Next, the details of information processing in the exemplary embodiment will be described in detail with reference to FIG. 17 to FIG. 22.

[Used Data]

Figure 17:
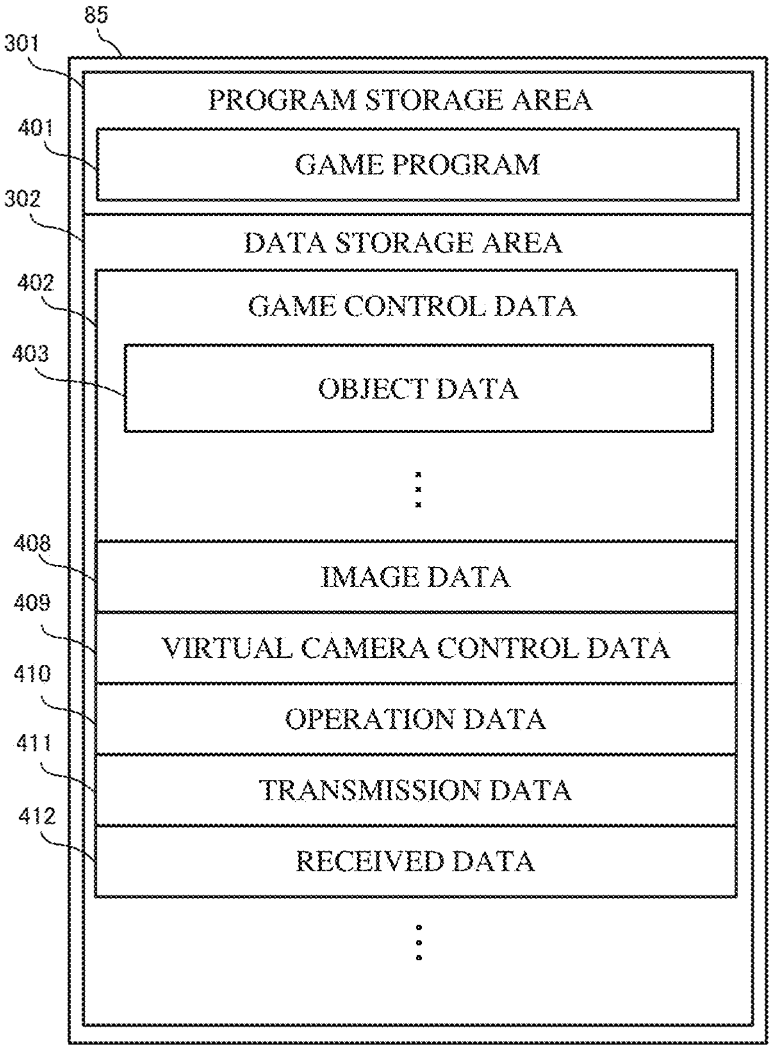
FIG. 17 shows a non-limiting example of various data stored in a DRAM 85.

Various data to be used in this game processing will be described. FIG. 17 shows an example of data stored in the DRAM 85 of the game system 1. As shown in FIG. 17, at least a program storage area 301 and a data storage area 302 are provided in the DRAM 85. In the program storage area 301, a game program 401 is stored. In the data storage area 302, game control data 402, image data 408, virtual camera control data 409, operation data 410, transmission data 411, received data 412, and the like are stored. The game control data 402 includes object data 403.

The game program 401 is a game program for executing this game processing.

The object data 403 is data of objects to be placed in a virtual space, and is data of objects such as an own player character, enemy characters, items, terrains, blocks, rocks, stones, trees, and buildings. In addition, the object data 403 includes data of coordinates (positions), orientations, postures, states, and the like of objects.

The image data 408 is image data of backgrounds, virtual effects, and the like.

The virtual camera control data 409 is data for controlling movement of a virtual camera placed in the virtual space. Specifically, the virtual camera control data 409 is data for designating the position, the orientation, the angle of view, the imaging direction, and the like of the virtual camera.

The operation data 410 is data indicating the contents of operations performed on the left controller 3 and the right controller 4. For example, the operation data 410 includes data indicating input states regarding movements, orientation changes, press states of various buttons, and the like of the left controller 3 and the right controller 4. The contents of the operation data are updated at predetermined cycles on the basis of signals from the left controller 3 and the right controller 4.

The transmission data 411 is data to be transmitted to another game system 1, and includes at least information for specifying a transmission source and the contents of the operation data 410. The transmission data 411 includes data (data indicating the coordinates (position), the posture, the state, and the like) regarding the own player character, to be transmitted to another game system 1 of a multiplay competitor, and the like.

The received data 412 is transmission data received from other game systems 1 and stored so as to be able to be identified for each of the other game systems 1 (i.e., for each transmission source). The received data 412 includes data (data indicating the coordinates (positions), the postures, the states, and the like) regarding other-player-related characters, received from other game systems 1 of multiplay competitors (or from the server).

Besides, various data to be used in the game processing are stored as necessary in the DRAM 85.

[Details of Game Processing]

Next, the details of the game processing according to the exemplary embodiment will be described with reference to flowcharts. FIG. 18 to FIG. 21 show examples of flowcharts showing the details of the game processing according to the exemplary embodiment.

Figure 18:
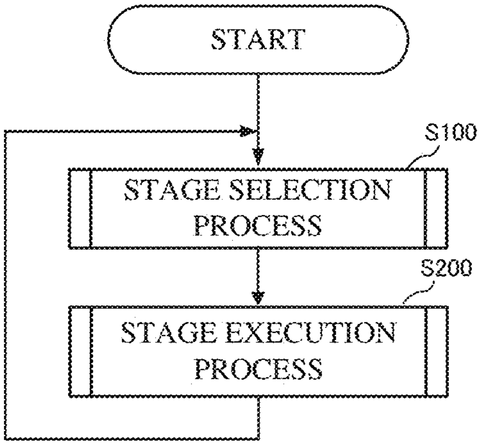
FIG. 18 is a non-limiting example of a flowchart of game processing.

First, when this game processing is started, in step S100 in FIG. 18, the processor 81 performs a stage selection process described later with reference to FIG. 19. Then, the process proceeds to step S200.

In step S200, the processor 81 performs a stage execution process described later with reference to FIG. 20 and FIG. 21. Then, the process returns to step S100. This game processing ends when a game ending operation is performed in the stage selection process in step S100 described later with reference to FIG. 19.

Figure 19:
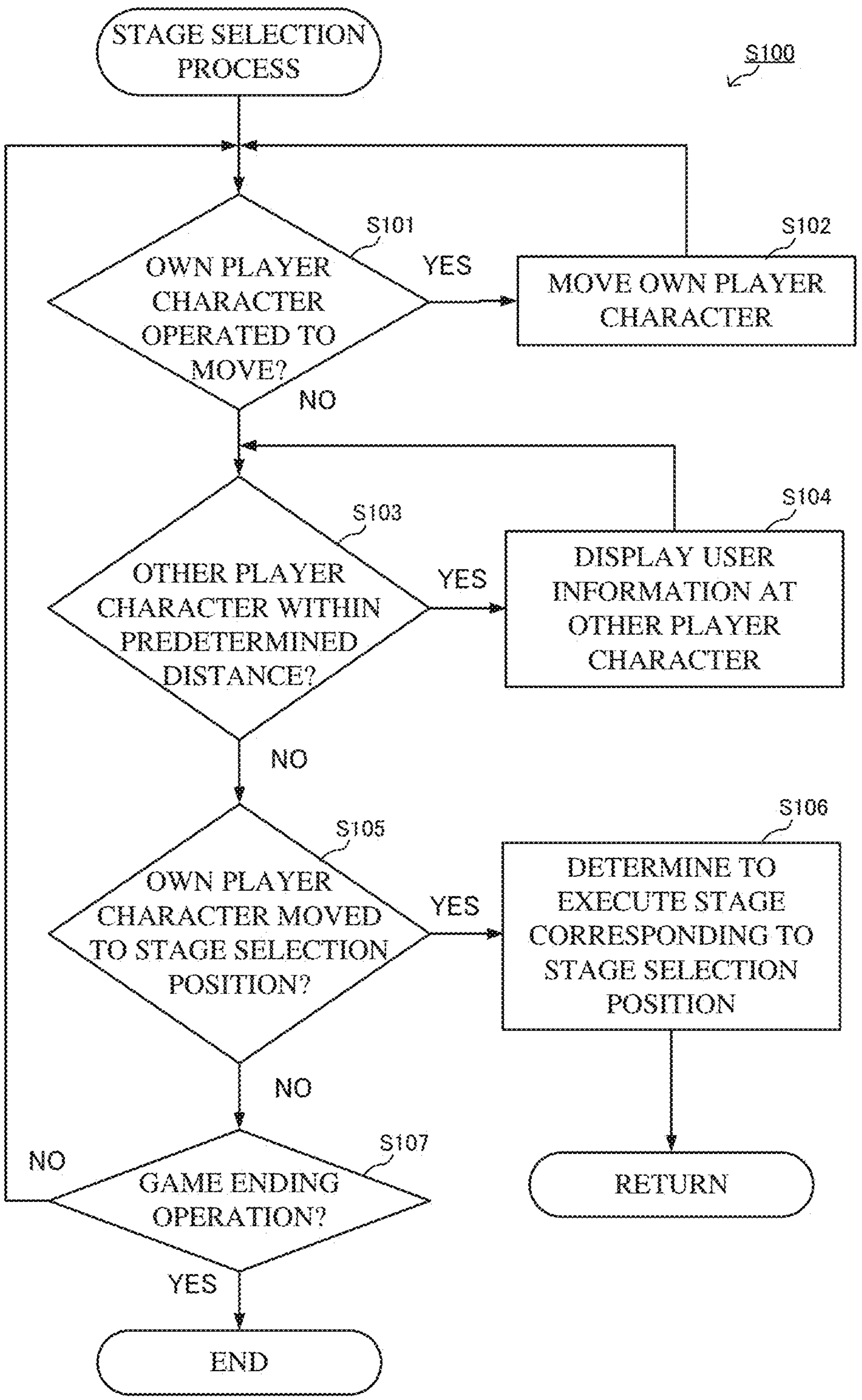
FIG. 19 is a non-limiting example of a flowchart of game processing.

FIG. 19 shows an example of a flowchart showing the details of the stage selection process. Hereinafter, description will be given with reference to FIG. 19.

First, in step S101, the processor 81 determines whether or not a movement operation for the own player character has been performed, on the basis of the operation data 410. If the determination result is YES, the process proceeds to step S102, and if the determination result is NO, the process proceeds to step S103.

In step S102, the processor 81 moves the own player character on the basis of the operation in step S101. In addition, the processor 81 transmits the position, the posture, and the like of the own player character to another game system 1 (other game apparatus) of a multiplay competitor. Then, the process returns to step S101. Through the processing in steps S101 and S102, the own player character 200 moves in the stage selection space in accordance with the operation by the player (see FIG. 5(1)).

In step S103, the processor 81 determines whether or not another player character is present within a predetermined distance (e.g., a radius of 2 meters) from the own player character in the stage selection space, on the basis of the object data 403, the received data 412, and the like. If the determination result is YES, the process proceeds to step S104, and if the determination result is NO, the process proceeds to step S105.

In step S104, the processor 81 displays user information at the other player character determined to be present within the predetermined distance in step S103. Specifically, as described with reference to FIG. 5(1), information about the player (user) who operates the other player character is displayed above the other player character. Here, the processor 81 has received the position, the posture, the user information, and the like about the other player character, from the other game system 1 of the multiplay competitor. Then, the process returns to step S103.

In step S105, the processor 81 determines whether or not the own player character has moved to any stage selection position in the stage selection space, on the basis of the object data 403, the received data 412, and the like. If the determination result is YES, the process proceeds to step S106, and if the determination result is NO, the process proceeds to step S107.

In step S106, the processor 81 determines to execute the stage corresponding to the stage selection position to which the own player character has moved in step S105. That is, the processor 81 determines to execute the game stage selected by the player operating the own player character. Then, the process proceeds to step S200 in FIG. 18, to start a game on the stage selected by the player in step S106.

In step S107, the processor 81 determines whether or not a predetermined game ending operation has been performed, on the basis of the operation data 410. If the determination result is YES, this game processing ends, and if the determination result is NO, the process returns to step S101.

Figure 20:
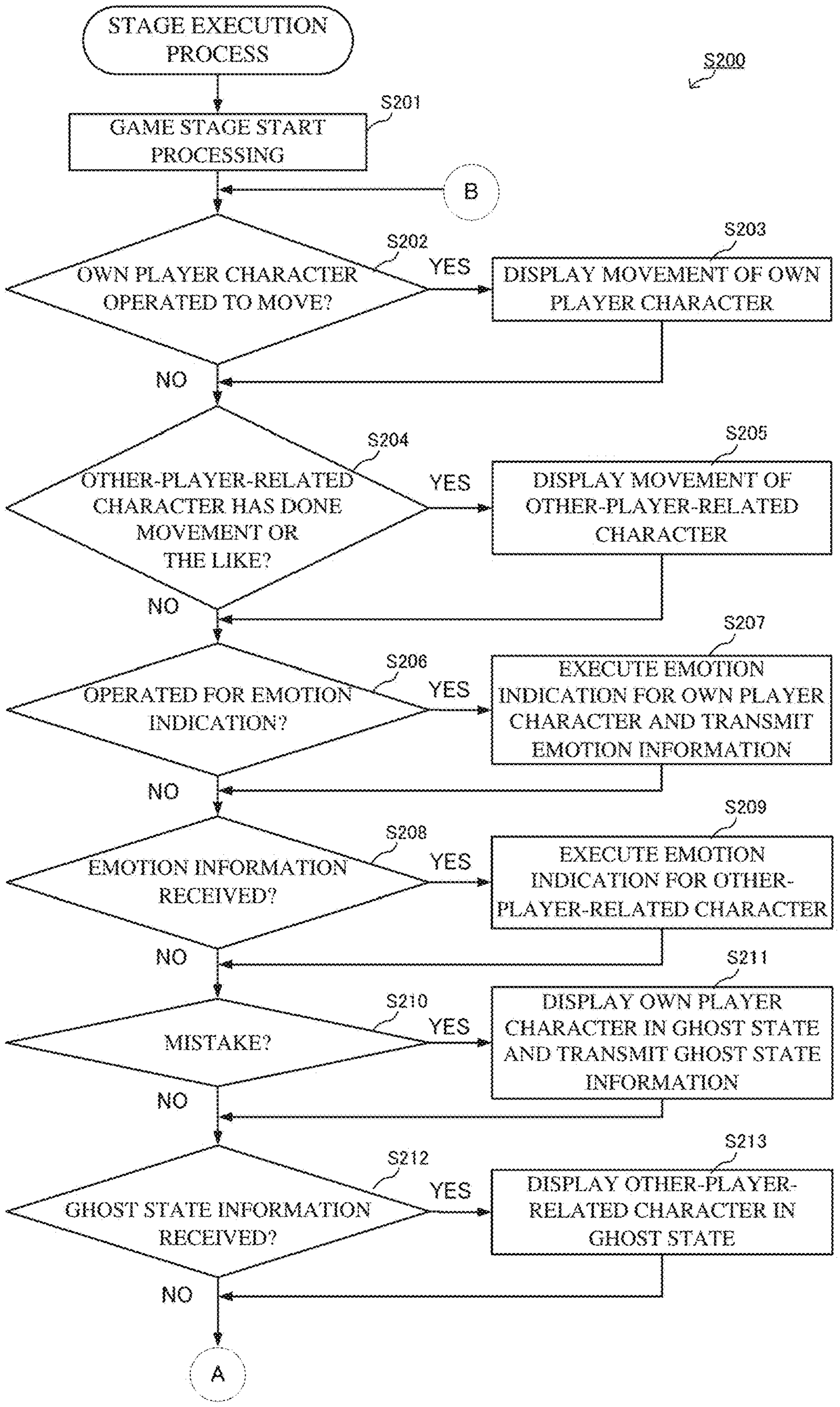
FIG. 20 is a non-limiting example of a flowchart of game processing.
Figure 21:
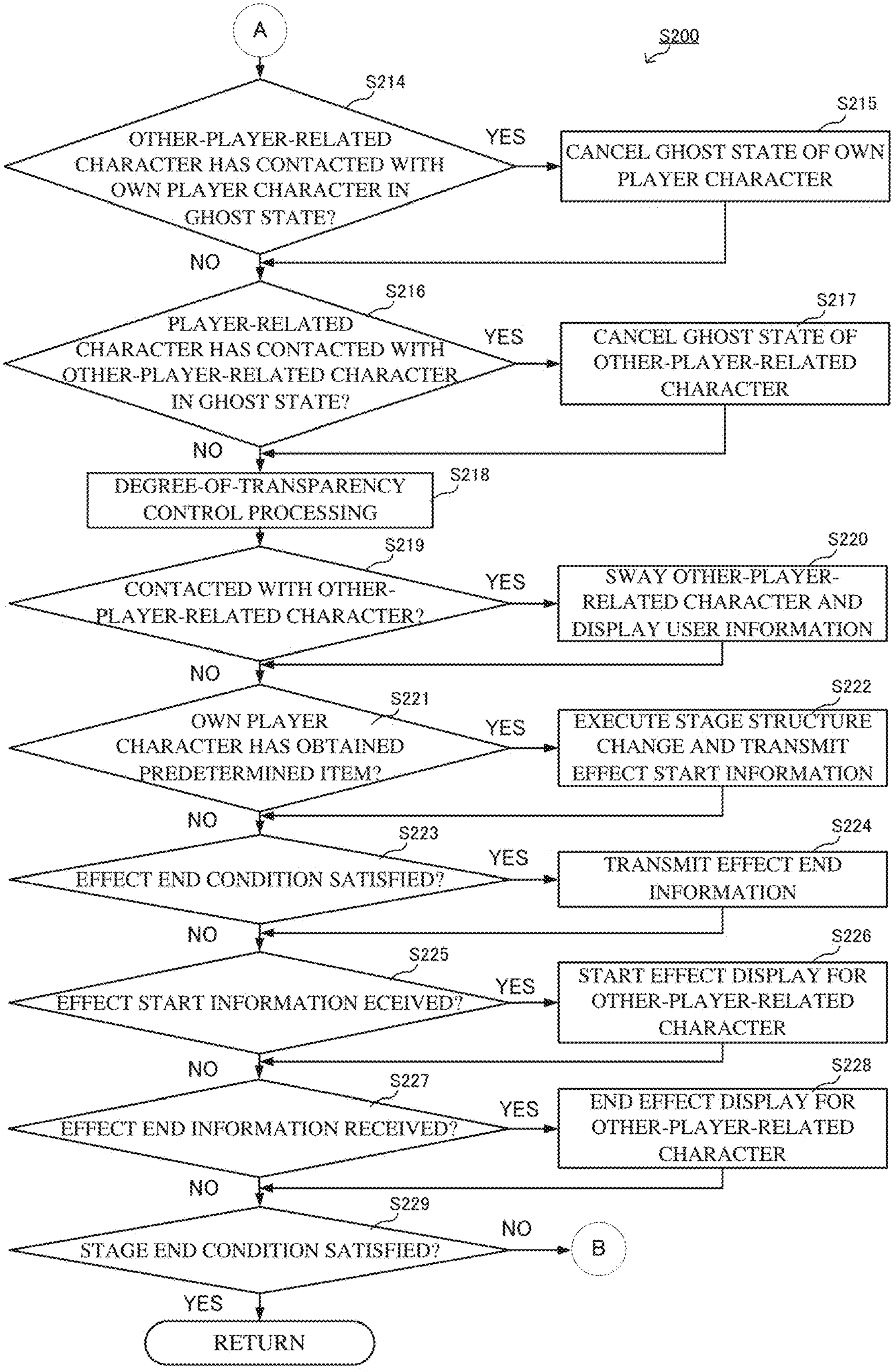
FIG. 21 is a non-limiting example of a flowchart of game processing.

FIG. 20 and FIG. 21 show examples of flowcharts showing the details of the stage execution process. Hereinafter, description will be given with reference to FIG. 20 and FIG. 21.

First, in step S201, the processor 81 performs stage start processing to start the game stage determined in step S106 in FIG. 19. Then, the process proceeds to step S202.

In step S202, the processor 81 determines whether or not a movement operation for the own player character has been performed, on the basis of the operation data 410. If the determination result is YES, the process proceeds to step S203, and if the determination result is NO, the process proceeds to step S204.

In step S203, the processor 81 displays movement of the own player character on the basis of the operation in step S202. In addition, the processor 81 transmits the position, the posture, and the like of the own player character, to another game system 1 (other game apparatus) of a multiplay competitor. Then, the process proceeds to step S204. Through the processing in steps S202 and S203, the own player character moving in accordance with the operation by the player in the stage space is displayed on the screen (see FIG. 6(1), etc.).

In step S204, the processor 81 determines whether or not an other-player-related character has done movement, posture change, or the like in the stage space in the game apparatus of a multiplay competitor, on the basis of the received data 412 and the like. If the determination result is YES, the process proceeds to step S205, and if the determination result is NO, the process proceeds to step S206. As described above, the other-player-related character is a character that acts on the basis of an operation by another player who is a multiplay competitor, and is either of another player character and a replay character.

In step S205, the processor 81 displays movement or the like that the other-player-related character has done, on the basis of the received data 412 received in step S204 and the like. Then, the process proceeds to step S206. Through the processing in steps S204 and S205, the other-player-related character doing movement or the like is displayed on the screen (see FIG. 6(1), etc.). In a case where the other-player-related character is a replay character, display of movement of the replay character and the like are performed on the basis of data (operation record data of the other player character in the past) regarding the position, the posture, and the like of the replay character received from the server (see FIG. 4), for example.

In step S206, the processor 81 determines whether or not an operation for an emotion indication has been performed, on the basis of the operation data 410. If the determination result is YES, the process proceeds to step S207, and if the determination result is NO, the process proceeds to step S208.

In step S207, the processor 81 executes an emotion indication for the own player character during a predetermined period (e.g., 20 seconds), and transmits emotion indication information to another game apparatus of a multiplay competitor. Then, the process proceeds to step S208.

In step S208, the processor 81 determines whether or not emotion information has been received from another game apparatus of a multiplay competitor (or from the server in a case of a replay character), on the basis of the received data 412. If the determination result is YES, the process proceeds to step S209, and if the determination result is NO, the process proceeds to step S210.

In step S209, the processor 81 executes an emotion indication for the other-player-related character corresponding to the emotion information received in step S208, during a predetermined period (e.g., 20 seconds). In addition, during execution of an emotion indication, the processor 81 displays, opaquely, the other-player-related character which has been displayed translucently (see FIG. 9). Then, the process proceeds to step S210. Through the processing in steps S206 to S209, emotion indications are performed on the own game apparatus and the other game apparatus.

In step S210, the processor 81 determines whether or not the own player character has made a mistake such as contacting with an enemy character, on the basis of the operation data 410, the object data 403, and the like. If the determination result is YES, the process proceeds to step S211, and if the determination result is NO, the process proceeds to step S212.

In step S211, the processor 81 displays the own player character in a ghost state (see FIG. 11), and transmits ghost state information to another game apparatus of a multiplay competitor. Then, the process proceeds to step S212.

In step S212, the processor 81 determines whether or not ghost state information has been received from another game apparatus of a multiplay competitor (or from the server in a case of a replay character), on the basis of the received data 412. If the determination result is YES, the process proceeds to step S213, and if the determination result is NO, the process proceeds to step S214 in FIG. 21.

In step S213, the processor 81 displays the other-player-related character corresponding to the ghost state information received in step S212, opaquely in a ghost state during a predetermined period (5 seconds) (see FIG. 10). Then, the process proceeds to step S214 in FIG. 21.

In step S214 in FIG. 21, the processor 81 determines whether or not an other-player-related character has contacted with the own player character in a ghost state, on the basis of the object data 403, the received data 412, and the like. If the determination result is YES, the process proceeds to step S215, and if the determination result is NO, the process proceeds to step S216.

In step S215, the processor 81 cancels the ghost state of the own player character (see FIG. 11). Then, the process proceeds to step S216.

In step S216, the processor 81 determines whether or not a player-related character has contacted with an other-player-related character in a ghost state, on the basis of the object data 403, the received data 412, and the like. If the determination result is YES, the process proceeds to step S217, and if the determination result is NO, the process proceeds to step S218.

In step S217, the processor 81 cancels the ghost state of the other-player-related character (see FIG. 10). Then, the process proceeds to step S218.

In step S218, the processor 81 performs degree-of-transparency control processing for an other-player-related character. The degree-of-transparency control processing is processing of controlling the degree of transparency of an other-player-related character as described specifically with reference to FIG. 6(1), FIG. 8 to FIG. 10, FIG. 12, FIG. 13, and the like. For convenience of description, step S218 is placed before step S219, but the processing in step S218 is continuously executed during a period in which an other-player-related character is displayed on the screen in the stage execution process.

FIG. 22 is a diagram (table) illustrating the degree of transparency of an other-player-related character. In step S218, the processor 81 controls the degree of transparency of an other-player-related character in accordance with the content shown in FIG. 22. Hereinafter, description will be given specifically.

As shown in FIG. 22, in a case of displaying another player character that is another player character in remote multiplay and is in a normal state (a state that is normal and is neither a ghost state nor an emotion indication state), if the number of other-player-related characters in the display screen is 1, the processor 81 displays the other player character at a degree of transparency of 60% (see FIG. 12(1)). If the multiplay communication condition is deteriorated (the communication speed is equal to or smaller than a predetermined speed), the processor 81 sets the degree of transparency at 70%.

In a case of displaying another player character that is another player character in remote multiplay and is in a normal state, if the number of other-player-related characters in the display screen is 2 or 3, the processor 81 displays the other player character at a degree of transparency of 80% (see FIG. 12(2)). If the multiplay communication condition is deteriorated, the processor 81 sets the degree of transparency at 90%. In this game, the number of other-player-related characters is 3 at maximum.

In a case of displaying another player character that is in a ghost state, performing an emotion indication, or in local multiplay, the processor 81 displays the other player character at a degree of transparency of 0% (opaque) (see FIG. 9, FIG. 10, and FIG. 13). Also when the multiplay communication condition is deteriorated, the processor 81 displays the other player character at a degree of transparency of 0% (opaque).

In a case of displaying a replay character, if the number of other-player-related characters in the display screen is 1, the processor 81 displays the other player character at a degree of transparency of 60%. If the multiplay communication condition is deteriorated (the communication speed is equal to or smaller than a predetermined speed), the processor 81 sets the degree of transparency at 70%.

In a case of displaying a replay character, if the number of other-player-related characters in the display screen is 2 or 3, the processor 81 displays the other player character at a degree of transparency of 80%. If the multiplay communication condition is deteriorated, the processor 81 sets the degree of transparency at 90%.

In step S219, the processor 81 determines whether or not the own player character has contacted with (at least partially overlapped) an other-player-related character, on the basis of the object data 403, the received data 412, and the like. If the determination result is YES, the process proceeds to step S220, and if the determination result is NO, the process proceeds to step S221.

In step S220, the processor 81 sways the other-player-related character determined to have contacted with the own player character in step S219 and displays user information about the other-player-related character (see FIG. 7, FIG. 8, and FIG. 10). Here, the other-player-related character that is in a ghost state is not swayed by contact, but may be swayed by contact. Then, the process proceeds to step S221.

In step S221, the processor 81 determines whether or not the own player character has obtained a predetermined item, on the basis of the object data 403 and the like. If the determination result is YES, the process proceeds to step S222, and if the determination result is NO, the process proceeds to step S223.

In step S222, the processor 81 executes stage structure change in the stage space (see FIG. 14(2-1) and FIG. 15(2-2)), and transmits effect start information to another game apparatus of a multiplay competitor. The other game apparatus that has received the effect start information starts to display the effect image 260 described with reference to FIG. 15(1-2). Then, the process proceeds to step S223.

In step S223, the processor 81 determines whether or not an effect end condition is satisfied. The effect end condition is, for example, that a predetermined period (e.g., 30 seconds) has elapsed since start of display of the effect image 260 described above. If the determination result is YES, the process proceeds to step S224, and if the determination result is NO, the process proceeds to step S225.

In step S224, the processor 81 transmits effect end information to another game apparatus of a multiplay competitor. The other game apparatus that has received the effect end information ends display of the effect image 260. Then, the process proceeds to step S225.

In step S225, the processor 81 determines whether or not effect start information has been received from another game apparatus of a multiplay competitor. If the determination result is YES, the process proceeds to step S226, and if the determination result is NO, the process proceeds to step S227.

In step S226, the processor 81 starts effect display for the other-player-related character corresponding to the effect start information received in step S225 (see FIG. 15(1-2)). Then, the process proceeds to step S227.

In step S227, the processor 81 determines whether or not effect end information has been received from another game apparatus of a multiplay competitor. If the determination result is YES, the process proceeds to step S228, and if the determination result is NO, the process proceeds to step S229.

In step S228, the processor 81 ends the effect display started in step S226. Then, the process proceeds to step S229.

In step S229, the processor 81 determines whether or not a stage end condition is satisfied. The stage end condition is that the own player character has reached a goal point of the stage or that, after the own player character has made a mistake and come into a ghost state, a predetermined period (e.g., 5 seconds) has elapsed while the own player character remains in the ghost state. If the determination result is YES, the process returns to step S100 in FIG. 18, and if the determination result is NO, the process returns to step S202 in FIG. 20.

As described above, according to the exemplary embodiment, stage spaces having the same (or similar) structure (configuration) are provided in a plurality of game apparatuses, to perform multiplay. Then, on the stage screen on the own game apparatus, another player character is displayed translucently without interfering with an object (see FIG. 6, FIG. 12, and the like). Thus, while multiplay is performed, the influence of other player characters is small in the multiplay and the stage screen can be prevented from becoming complicated and hard to see.

According to the exemplary embodiment, on the stage screen (and the stage selection screen) on the own game apparatus, when the own player character has contacted with (overlapped) another player character, user information about the other player character is displayed opaquely (see FIG. 5, FIG. 7, and the like). In this way, the player can see user information at a desired timing while the stage screen is prevented from becoming complicated and hard to see due to user information being always displayed. In addition, on the stage screen on the own game apparatus, when the other player character is in a ghost state or performing an emotion indication, the other player character is displayed opaquely (see FIG. 9 and FIG. 10). Thus, it becomes possible to emphasize the ghost state during which the other player character can be recovered or emphasize that the other player character is performing an emotion indication.

According to the exemplary embodiment, on the stage screen on the own game apparatus, when the number of displayed other-player-related characters increases (becomes two or more), the degrees of transparency of the other-player-related characters are further reduced (see FIG. 12, FIG. 22, and the like). Thus, it is possible to prevent the stage screen from becoming complicated and hard to see when the number of displayed other-player-related characters is increased. In addition, the degrees of transparency of the other-player-related characters are gradually changed, whereby the degrees of transparency can be switched without giving a feeling of strangeness.

[Modifications]

In the above exemplary embodiment, with reference to FIG. 14 to FIG. 16 and the like, it has been described that, in a case where another player character that is a multiplay competitor has obtained an item and thus structure change has occurred on the stage screen (stage space) on the other game apparatus, the other player character is displayed with an effect image imparted thereto on the stage screen on the own game apparatus. However, control may be performed such that, in a case where another player character that is a multiplay competitor has obtained an item and thus structure change has occurred on the stage screen (stage space) on the other game apparatus, the other player character is not displayed on the stage screen on the own game apparatus and an effect image is not displayed, too. Further, in a case where the own player character has also obtained an item and thus structure change has occurred also on the stage screen (stage space) on the own game apparatus, the other player character is displayed again on the stage screen on the own game apparatus (not shown). With this configuration, it becomes possible to intentionally prevent a player from inferring what structure change has occurred on the stage screen (stage space) on the other game apparatus.

In the above exemplary embodiment, the case where the sequential processing in the game processing is executed by a single game apparatus has been described. In another exemplary embodiment, the sequential processing may be executed in an information processing system including a plurality of information processing apparatuses. For example, in an information processing system including a terminal-side apparatus and a server-side apparatus that can communicate with the terminal-side apparatus via a network, a part of the sequential processing may be executed by the server-side apparatus. In an information processing system including a terminal-side apparatus and a server-side apparatus that can communicate with the terminal-side apparatus via a network, a major part of the sequential processing may be executed by the server-side apparatus and a part of the sequential processing may be executed by the terminal-side apparatus. In the information processing system, a server-side system may include a plurality of information processing apparatuses and processing to be executed on the server side may be executed by the plurality of information processing apparatuses in a shared manner. A configuration of so-called cloud gaming may be adopted. For example, the game apparatus may transmit operation data indicating a user's operation to a predetermined server, various game processing may be executed on the server, and the execution result may be distributed as a video and a sound by streaming to the game apparatus.

While the exemplary embodiments and modifications have been described above, it is to be understood that the above description is, in all aspects, merely an illustrative example, and is not intended to limit the scope thereof. In addition, it is to be understood that various improvements and changes can be made on the exemplary embodiments and modifications.

What is claimed is:

1. A non-transitory computer-readable storage medium having stored therein instructions which are executed by a processor of a game apparatus in which an own player character subjected to movement control on the basis of an operation by a user of the game apparatus, and one or more other player characters each subjected to movement control on the basis of data acquired from at least one of other game apparatuses connected to the game apparatus via a network, are placed in a virtual game space, the instructions, when executed by the processor, cause the game apparatus to provide execution comprising:

generating, for display, the virtual game space including a virtual environment having at least the own player character and one or more other player characters;

generating, for display, a first virtual object representing the own player character by drawing the own player character opaquely;

generating, for display, one or more second virtual objects representing the one or more other player character by drawing at least one character of the other player characters translucently at a degree of transparency based on a communication condition between the game apparatus and the other game apparatus; and updating display of the virtual space based on the communication condition between the game apparatus and the other game apparatus.

2. The non-transitory computer-readable storage medium according to claim 1, wherein the game apparatus is further caused to provide execution comprising:

drawing the at least one character at the degree of transparency according to a number of the other player characters drawn in the same screen.

3. The non-transitory computer-readable storage medium according to claim 1, wherein the other player characters include a player character operated by a user of the other game apparatus, and a replay character subjected to movement control on the basis of a play record of a user of the other game apparatus.

4. The non-transitory computer-readable storage medium according to claim 1, wherein the game apparatus is further caused to provide execution comprising:

performing movement control for the other player character on the basis of the data from the other game apparatus without causing the other player character to interfere with the own player character and an object placed in the game space.

5. The non-transitory computer-readable storage medium according to claim 1, wherein the game apparatus is further caused to provide execution comprising:

drawing the at least one character opaquely when a predetermined condition is satisfied.

6. The non-transitory computer-readable storage medium according to claim 1, wherein the game apparatus is further caused to provide execution comprising:

gradually changing the degree of transparency of the at least one character when a number of the other player characters changes.

7. The non-transitory computer-readable storage medium according to claim 6, wherein the degree of transparency is gradually changed linearly or stepwise.

8. The non-transitory computer-readable storage medium according to claim 1, wherein the communication condition relates to a connection speed between the game apparatus and the other game apparatus.

9. The non-transitory computer-readable storage medium according to claim 1, wherein the at least one character is drawn translucently at the degree of transparency based on a number of the other player characters.

10. A game processing system in which an own player character subjected to movement control on the basis of an operation by a user of the game apparatus, and one or more other player characters each subjected to movement control on the basis of data acquired from at least one of other game apparatuses connected to the game apparatus via a network, are placed in a virtual game space, the game processing system, comprising:

a processor; and a memory configured to store computer readable instructions that, when executed by the processor, cause the game processing system to:

generate, for display, the virtual game space including a virtual environment having at least the own player character and one or more other player characters generate, for display, a first virtual object representing the own player character by drawing the own player character opaquely;

generate, for display, one or more second virtual objects representing the one or more other player character by drawing at least one character of the other player characters translucently at a degree of transparency based on a communication condition between the game apparatus and the other game apparatus; and update display of the virtual space based on the communication condition between the game apparatus and the other game apparatus.

11. The game processing system according to claim 10, wherein the game processing system is further caused to:

draw the at least one character at the degree of transparency according to a number of the other player characters drawn in the same screen.

12. The game processing system according to claim 10, wherein the other player characters include a player character operated by a user of the other game apparatus, and a replay character subjected to movement control on the basis of a play record of a user of the other game apparatus.

13. The game processing system according to claim 10, wherein the game processing system is further caused to:

perform movement control for the other player character on the basis of the data from the other game apparatus without causing the other player character to interfere with the own player character and an object placed in the game space.

14. The game processing system according to claim 10, wherein the game processing system is further caused to:

draw the at least one character opaquely when a predetermined condition is satisfied.

15. The game processing system according to claim 10, wherein the game processing system is further caused to:

gradually change the degree of transparency of the at least one character when a number of the other player characters changes.

16. A game processing method executed by a processor which controls a game processing system in which an own player character subjected to movement control on the basis of an operation by a user of the game apparatus, and one or more other player characters each subjected to movement control on the basis of data acquired from at least one of other game apparatuses connected to the game apparatus via a network, are placed in a virtual game space, the game processing method comprising:

generating, for display, the virtual game space including a virtual environment having at least the own player character and one or more other player characters;

generating, for display, a first virtual object representing the own player character by drawing the own player character opaquely;

generating, for display, one or more second virtual objects representing the one or more other player character by drawing at least one character of the other player characters translucently at a degree of transparency based on a communication condition between the game apparatus and the other game apparatus; and updating display of the virtual space based on the communication condition between the game apparatus and the other game apparatus.

17. The game processing method according to claim 16, further comprising:

drawing the at least one character at the degree of transparency according to a number of the other player characters drawn in the same screen.

18. The game processing method according to claim 16, wherein the other player characters include a player character operated by a user of the other game apparatus, and a replay character subjected to movement control on the basis of a play record of a user of the other game apparatus.

19. The game processing method according to claim 16, further comprising:

performing movement control for the other player character on the basis of the data from the other game apparatus without causing the other player character to interfere with the own player character and an object placed in the game space.

20. The game processing method according to claim 16, further comprising:

drawing the at least one character opaquely when a predetermined condition is satisfied.

21. The game processing method according to claim 16, further comprising:

gradually changing the degree of transparency of the at least one character when a number of the other player characters changes.

* * * * *